(12) United States Patent
Peng et al.

(10) Patent No.: US 10,932,162 B2
(45) Date of Patent: Feb. 23, 2021

(54) HANDOVER METHOD AND APPARATUS

(71) Applicant: HUAWEI TECHNOLOGIES CO., LTD., Guangdong (CN)

(72) Inventors: Wenjie Peng, Shanghai (CN); Hongzhuo Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/295,066

(22) Filed: Mar. 7, 2019

(65) Prior Publication Data

US 2019/0208446 A1 Jul. 4, 2019

Related U.S. Application Data

(63) Continuation of application No. PCT/CN2016/098283, filed on Sep. 7, 2016.

(51) Int. Cl.
*H04W 36/38* (2009.01)
*H04W 36/00* (2009.01)
*H04W 36/08* (2009.01)

(52) U.S. Cl.
CPC ... *H04W 36/0016* (2013.01); *H04W 36/0033* (2013.01); *H04W 36/08* (2013.01); *H04W 36/38* (2013.01)

(58) Field of Classification Search
CPC . H04W 36/0016; H04W 36/38; H04W 36/08; H04W 36/0033
See application file for complete search history.

(56) References Cited

U.S. PATENT DOCUMENTS

2011/0002305 A1* 1/2011 Park ................. H04W 36/0066
370/331
2013/0316712 A1* 11/2013 Lee ....................... H04W 36/00
455/436
(Continued)

FOREIGN PATENT DOCUMENTS

CN 101483897 A 7/2009
CN 102088793 A * 6/2011 ............ H04W 74/08
(Continued)

OTHER PUBLICATIONS

Extended European Search Report issued in European Application No. 16915438.2 dated Apr. 25, 2019, 9 pages.
(Continued)

*Primary Examiner* — Lakeram Jangbahadur
(74) *Attorney, Agent, or Firm* — Fish & Richardson P.C.

(57) ABSTRACT

The present disclosure relates to handover methods and apparatus. One example method includes sending, by a base station, a handover request message to a target controller, configuring, by the target controller based on the handover request message, a parameter including connection status information for a user equipment, sending a handover request response message including the parameter to the base station, sending, by the base station, a connection reconfiguration message including the parameter to the user equipment, receiving, by the user equipment, the connection reconfiguration message, and establishing, based on the parameter and in a connection status indicated by the connection status information, a connection to a cell managed by the target controller.

11 Claims, 17 Drawing Sheets

(56) References Cited

U.S. PATENT DOCUMENTS

| | | | |
|---|---|---|---|
| 2014/0135007 A1* | 5/2014 | Yu | H04W 36/00 455/436 |
| 2015/0055544 A1 | 2/2015 | Lee et al. | |
| 2015/0141002 A1 | 5/2015 | Ma et al. | |
| 2015/0146688 A1* | 5/2015 | Yasuda | H04W 36/0005 370/331 |
| 2016/0100341 A1* | 4/2016 | Wu | H04W 36/0083 455/436 |
| 2017/0230887 A1 | 8/2017 | Zhang et al. | |
| 2018/0124656 A1* | 5/2018 | Park | H04W 36/0022 |
| 2019/0208453 A1* | 7/2019 | Xu | H04W 92/20 |

FOREIGN PATENT DOCUMENTS

| | | |
|---|---|---|
| CN | 102088793 A | 6/2011 |
| CN | 103458418 A | 12/2013 |
| CN | 103999525 A | 8/2014 |
| CN | 105637908 A | 6/2016 |
| CN | 105745852 A | 7/2016 |
| EP | 2866494 A1 | 4/2015 |
| WO | 2012124919 A2 | 9/2012 |
| WO | 2014059663 A1 | 4/2014 |

OTHER PUBLICATIONS

PCT International Search Report and Written Opinion issued in International Application No. PCT/CN2016/098283 dated Jan. 6, 2017, 18 pages.
Office Action issued in Chinese Application No. 201680087920.9 dated Dec. 17, 2019, 8 pages.

\* cited by examiner

HANDOVER METHOD AND APPARATUS

CROSS-REFERENCE TO RELATED APPLICATIONS

This application is a continuation of International Application No. PCT/CN2016/098283, filed on Sep. 7, 2016, the disclosure of which is hereby incorporated by reference in its entirety.

TECHNICAL FIELD

Embodiments of the present invention relate to the communications technologies, and in particular, to a handover method and an apparatus.

BACKGROUND

Development of a Long Term Evolution (Long Term Evolution, LTE for short) technology brings a no cell system. The no cell system includes a transmission point (Transmission Point, TP for short) of a controller (controller). A hyper cell (hyper cell) covers a plurality of TPs. The controller manages a radio resource of the hyper cell, and the TP provides an air interface resource for user equipment. When the user equipment accesses the hyper cell, the user equipment communicates with a core network by using the TP and the controller.

In a moving process of user equipment, if the user equipment moves from a coverage area of an LTE cell to a coverage area of a hyper cell, the user equipment needs to be handed over from the LTE cell to the hyper cell for ensuring service continuity. Similarly, if the user equipment moves from a coverage area of a hyper cell to a coverage area of an LTE cell, the user equipment needs to be handed over from the hyper cell to the LTE cell for ensuring service continuity.

The user equipment in the LTE cell has two states: a connected mode (RRC_CONNECTED) and an idle mode (RRC_IDLE). In the connected mode, the user equipment reports a corresponding reference signal to a network side based on configuration of a base station. In the idle mode, no information is exchanged between the user equipment and the base station. The user equipment in the hyper cell has two states: an active mode and an ECO mode. In the active mode, the user equipment continuously sends a first uplink reference signal to the TP, and the first uplink reference signal is configured by the controller. In the ECO mode, the user equipment sporadically sends a second uplink reference signal to the TP. It can be learned that the two states of the user equipment in the LTE cell cannot be completely corresponding to the two states of the user equipment in the hyper cell. Therefore, when the user equipment is handed over between the LTE cell and the hyper cell, an existing handover solution between LTE cells cannot be used.

SUMMARY

Embodiments of the present invention provide a handover method and an apparatus, so that user equipment is handed over between a cell managed by a base station and a cell managed by a controller, service continuity of the user equipment in a moving process is implemented, and a throughput of the user equipment is improved.

According to a first aspect, an embodiment of the present invention provides a handover method, including: sending, by a base station, a handover request message to a target controller, where the handover request message is used to instruct the target controller to configure a parameter for user equipment based on the handover request message, the parameter includes connection status information that is indicated by the target controller and that is of the user equipment when the user equipment is handed over to a cell managed by the target controller, and the base station has been connected to the user equipment; receiving, by the base station from the target controller, a handover request response message including the parameter; and sending, by the base station, a connection reconfiguration message including the parameter to the user equipment, where the connection reconfiguration message is used to instruct the user equipment to establish, based on the parameter and in a connection status indicated by the connection status information, a connection to the cell managed by the target controller. Therefore, the user equipment is handed over, in a proper connection status, from a cell managed by the base station to a cell managed by the target controller, service continuity of the user equipment in a moving process is implemented, and a throughput of the user equipment is improved.

In a possible implementation of the first aspect, the handover request message includes bearer information of the user equipment, and the bearer information is used to instruct the target controller to indicate the connection status information to the user equipment based on the bearer information. Therefore, the connection status information is indicated to the user equipment based on the bearer information of the user equipment with high accuracy.

In a possible implementation of the first aspect, the parameter further includes a first uplink reference signal and a channel used to send the first uplink reference signal, a second uplink reference signal and a channel used to send the second uplink reference signal, and an access sequence and a channel used to send the access sequence; and the connection status information includes first connection status information or second connection status information, where the first connection status information is used to instruct the user equipment to send, at preset first frequency through the channel used to send the first uplink reference signal, the first uplink reference signal to a TP managed by the target controller, the second connection status information is used to instruct the user equipment to send, at preset second frequency through the channel used to send the second uplink reference signal, the second uplink reference signal to the TP, and the preset first frequency is greater than the preset second frequency. Therefore, the user equipment may determine, based on the connection status information, a type of an uplink reference signal and frequency at which the uplink reference signal is sent to the TP of the target controller. When the user equipment of the base station performs a background service or a grant-free service, and the user equipment is handed over to the cell managed by the target controller, the user equipment directly enters a second connection status, so as to reduce power consumption of the user equipment.

In a possible implementation of the first aspect, after the sending, by the base station, a connection reconfiguration message including the parameter to the user equipment, the method further includes: receiving, by the base station, a context release message from the target controller, and releasing a context of the user equipment based on the context release message. Therefore, after receiving the context release message sent by the target controller, the base station releases the context of the user equipment based on the context release message, so as to save an air interface resource.

According to a second aspect, an embodiment of the present invention further provides a handover method, including: receiving, by a controller, a handover request message from a base station, where the controller is a target controller to which user equipment is to be handed over, and the base station has been connected to the user equipment; configuring, by the controller, a parameter for the user equipment based on the handover request message, where the parameter includes connection status information that is indicated by the controller and that is of the user equipment when the user equipment is handed over to a cell managed by the controller; and sending, by the controller, a handover request response message including the parameter to the base station, where the handover request response message is used to instruct the base station to send a connection reconfiguration message including the parameter to the user equipment.

In a possible implementation of the second aspect, the handover request message includes bearer information of the user equipment, and the bearer information is used to instruct the controller to indicate the connection status information to the user equipment based on the bearer information.

In a possible implementation of the second aspect, the parameter further includes a first uplink reference signal and a channel used to send the first uplink reference signal, a second uplink reference signal and a channel used to send the second uplink reference signal, and an access sequence and a channel used to send the access sequence; and the connection status information includes first connection status information or second connection status information, where the first connection status information is used to instruct the user equipment to send, at preset first frequency through the channel used to send the first uplink reference signal, the first uplink reference signal to a transmission point TP managed by the target controller, the second connection status information is used to instruct the user equipment to send, at preset second frequency through the channel used to send the second uplink reference signal, the second uplink reference signal to the TP, and the preset first frequency is greater than the preset second frequency.

In a possible implementation of the second aspect, after the sending, by the controller, a handover request response message including the parameter to the base station, the method further includes: receiving, by the controller, a measurement report from the TP, and determining a target TP in the TP based on the measurement report; and sending, by the controller, a configuration message to the target TP, where the configuration information is used to instruct the target TP to perform data transmission with the user equipment.

In a possible implementation of the second aspect, after the sending, by the controller, a configuration message to the target TP, the method further includes: receiving, by the controller, a connection complete indication message from the target TP, where the connection complete indication message is used to indicate that the user equipment is connected to the target TP; and sending, by the controller, a context release message to the base station.

According to a third aspect, an embodiment of the present invention provides a handover method, including: receiving, by user equipment from a base station, a connection reconfiguration message including a parameter, where the parameter is configured by a target controller for the user equipment based on a handover request message, the parameter includes connection status information that is indicated by the target controller and that is of the user equipment when the user equipment is handed over to a cell managed by the target controller, and the base station has been connected to the user equipment; and establishing, by the user equipment based on the parameter and in a connection status indicated by the connection status information, a connection to the cell managed by the target controller.

In a possible implementation of the third aspect, the handover request message includes bearer information of the user equipment, and the bearer information is used to instruct the target controller to indicate the connection status information to the user equipment based on the bearer information.

In a possible implementation of the third aspect, the parameter further includes a first uplink reference signal and a channel used to send the first uplink reference signal, a second uplink reference signal and a channel used to send the second uplink reference signal, and an access sequence and a channel used to send the access sequence; and the connection status information includes first connection status information or second connection status information, where the first connection status information is used to instruct the user equipment to send, at preset first frequency through the channel used to send the first uplink reference signal, the first uplink reference signal to a transmission point TP managed by the target controller, the second connection status information is used to instruct the user equipment to send, at preset second frequency through the channel used to send the second uplink reference signal, the second uplink reference signal to the TP, and the preset first frequency is greater than the preset second frequency.

In a possible implementation of the third aspect, when the connection status information is the first connection status information, the establishing, by the user equipment based on the parameter and in a connection status indicated by the connection status information, a connection to the cell managed by the target controller includes: sending, by the user equipment through the channel used to send the first uplink reference signal, the first uplink reference signal to the TP at the preset first frequency; or when the connection status information is the second connection status information, the establishing, by the user equipment based on the parameter and in a connection status indicated by the connection status information, a connection to the cell managed by the target controller includes: sending, by the user equipment through the channel used to send the second uplink reference signal, the second uplink reference signal to the TP at the preset second frequency.

In a possible implementation of the third aspect, after the user equipment sends, at the preset first frequency through the channel used to send the first uplink reference signal, the first uplink reference signal to the TP managed by the target controller, or after the user equipment sends, at the preset second frequency through the channel used to send the second uplink reference signal, the second uplink reference signal to the TP managed by the target controller, the method further includes: receiving, by the user equipment, an access response message from a target TP in the TP; and sending, by the user equipment, a connection reconfiguration complete message to the target TP.

According to a fourth aspect, an embodiment of the present invention further provides a base station, including: a first transmitter, configured to send a handover request message to a target controller under an instruction of a processor, where the handover request message is used to instruct the target controller to configure a parameter for user equipment based on the handover request message, the parameter includes connection status information that is indicated by the target controller and that is of the user equipment when the user equipment is handed over to a cell managed by the target controller, and the base station has been connected to the user equipment; a receiver, configured to receive, from the target controller, a handover request response message including the parameter; and a second transmitter, configured to send, under an instruction of the processor, a connection reconfiguration message including the parameter to the user equipment, where the connection reconfiguration message is used to instruct the user equipment to establish, based on the parameter and in a connection status indicated by the connection status information, a connection to the cell managed by the target controller.

In a possible implementation of the fourth aspect, the handover request message includes bearer information of the user equipment, and the bearer information is used to instruct the target controller to indicate the connection status information to the user equipment based on the bearer information.

In a possible implementation of the fourth aspect, the parameter further includes a first uplink reference signal and a channel used to send the first uplink reference signal, a second uplink reference signal and a channel used to send the second uplink reference signal, and an access sequence and a channel used to send the access sequence; and the connection status information includes first connection status information or second connection status information, where the first connection status information is used to instruct the user equipment to send, at preset first frequency through the channel used to send the first uplink reference signal, the first uplink reference signal to a TP managed by the target controller, the second connection status information is used to instruct the user equipment to send, at preset second frequency through the channel used to send the second uplink reference signal, the second uplink reference signal to the TP, and the preset first frequency is greater than the preset second frequency.

In a possible implementation of the fourth aspect, the receiver is further configured to receive a context release message from the target controller; and the processor is further configured to release a context of the user equipment based on the context release message.

According to a fifth aspect, an embodiment of the present invention further provides a base station, including: a sending module, configured to send a handover request message to a target controller under an instruction of a processing module, where the handover request message is used to instruct the target controller to configure a parameter for user equipment based on the handover request message, the parameter includes connection status information that is indicated by the target controller and that is of the user equipment when the user equipment is handed over to a cell managed by the target controller, and the base station has been connected to the user equipment; a receiving module, configured to receive, from the target controller, a handover request response message including the parameter; and a sending module, configured to send, under an instruction of the processing module, a connection reconfiguration message including the parameter to the user equipment, where the connection reconfiguration message is used to instruct the user equipment to establish, based on the parameter and in a connection status indicated by the connection status information, a connection to the cell managed by the target controller.

According to a sixth aspect, an embodiment of the present invention provides a controller, including: a first receiver, configured to receive a handover request message from a base station, where the controller is a target controller to which user equipment is to be handed over, and the base station has been connected to the user equipment; a processor, configured to configure a parameter for the user equipment based on the handover request message, where the parameter includes connection status information that is indicated by the controller and that is of the user equipment when the user equipment is handed over to a cell managed by the controller; and a first transmitter, configured to send, under an instruction of the processor, a handover request response message including the parameter to the base station, where the handover request response message is used to instruct the base station to send a connection reconfiguration message including the parameter to the user equipment.

In a possible implementation of the sixth aspect, the handover request message includes bearer information of the user equipment, and the bearer information is used to instruct the controller to indicate the connection status information to the user equipment based on the bearer information.

In a possible implementation of the sixth aspect, the parameter further includes a first uplink reference signal and a channel used to send the first uplink reference signal, a second uplink reference signal and a channel used to send the second uplink reference signal, and an access sequence and a channel used to send the access sequence; and the connection status information includes first connection status information or second connection status information, where the first connection status information is used to instruct the user equipment to send, at preset first frequency through the channel used to send the first uplink reference signal, the first uplink reference signal to a transmission point TP managed by the target controller, the second connection status information is used to instruct the user equipment to send, at preset second frequency through the channel used to send the second uplink reference signal, the second uplink reference signal to the TP, and the preset first frequency is greater than the preset second frequency.

In a possible implementation of the sixth aspect, the controller further includes: a second receiver, configured to receive a measurement report from the TP, where the processor is further configured to determine a target TP in the TP based on the measurement report; and a second transmitter, configured to send a configuration message to the target TP under an instruction of the processor, where the configuration information is used to instruct the target TP to perform data transmission with the user equipment.

In a possible implementation of the sixth aspect, the second receiver is further configured to receive a connection complete indication message from the target TP, where the connection complete indication message is used to indicate that the user equipment is connected to the target TP; and the first transmitter is further configured to send a context release message to the base station under an instruction of the processor.

According to a seventh aspect, an embodiment of the present invention provides a controller, including: a receiving module, configured to receive a handover request message from a base station, where the controller is a target controller to which user equipment is to be handed over, and the base station has been connected to the user equipment; a processing module, configured to configure a parameter for the user equipment based on the handover request message, where the parameter includes connection status information that is indicated by the controller and that is of the user equipment when the user equipment is handed over to a cell managed by the controller; and a sending module, configured to send, under an instruction of the processor, a handover request response message including the parameter to the base station, where the handover request response message is used to instruct the base station to send a connection reconfiguration message including the parameter to the user equipment.

According to an eighth aspect, an embodiment of the present invention provides user equipment, including: a receiver, configured to receive, from a base station, a connection reconfiguration message including a parameter, where the parameter is configured by a target controller for the user equipment based on a handover request message, the parameter includes connection status information that is indicated by the target controller and that is of the user equipment when the user equipment is handed over to a cell managed by the target controller, and the base station has been connected to the user equipment; and a processor, configured to establish, based on the parameter and in a connection status indicated by the connection status information, a connection to the cell managed by the target controller.

In a possible implementation of the eighth aspect, the handover request message includes bearer information of the user equipment, and the bearer information is used to instruct the target controller to indicate the connection status information to the user equipment based on the bearer information.

In a possible implementation of the eighth aspect, the parameter further includes a first uplink reference signal and a channel used to send the first uplink reference signal, a second uplink reference signal and a channel used to send the second uplink reference signal, and an access sequence and a channel used to send the access sequence; and the connection status information includes first connection status information or second connection status information, where the first connection status information is used to instruct the user equipment to send, at preset first frequency through the channel used to send the first uplink reference signal, the first uplink reference signal to a transmission point TP managed by the target controller, the second connection status information is used to instruct the user equipment to send, at preset second frequency through the channel used to send the second uplink reference signal, the second uplink reference signal to the TP, and the preset first frequency is greater than the preset second frequency.

In a possible implementation of the eighth aspect, the terminal device further includes a transmitter; and when the connection status information is the first connection status information, the transmitter is configured to send, at the preset first frequency through the channel used to send the first uplink reference signal, the first uplink reference signal to the TP under an instruction of the processor; or when the connection status information is the second connection status information, the transmitter is configured to send, at the preset second frequency through the channel used to send the second uplink reference signal, the second uplink reference signal to the TP under an instruction of the processor.

In a possible implementation of the eighth aspect, the receiver is further configured to receive an access response message from a target TP in the TP; and the transmitter is further configured to send a connection reconfiguration complete message to the target TP under an instruction of the processor.

According to a ninth aspect, an embodiment of the present invention provides user equipment, including: a transceiver module, configured to receive, from a base station, a connection reconfiguration message including a parameter, where the parameter is configured by a target controller for the user equipment based on a handover request message, the parameter includes connection status information that is indicated by the target controller and that is of the user equipment when the user equipment is handed over to a cell managed by the target controller, and the base station has been connected to the user equipment; and a processing module, configured to establish, based on the parameter and in a connection status indicated by the connection status information, a connection to the cell managed by the target controller.

According to a tenth aspect, an embodiment of the present invention provides a communications system, including the base station according to the fourth aspect or the fifth aspect, the controller according to the sixth aspect or the seventh aspect, and the user equipment according to the eighth aspect or the ninth aspect.

According to an eleventh aspect, an embodiment of the present invention provides a handover method, including: receiving, by a base station, a handover request message from a controller, where the base station is a target base station to which user equipment is to be handed over, and the controller has been connected to the user equipment; configuring, by the base station, a parameter for the user equipment based on the handover request message, where the parameter includes connection status information that is indicated by the base station and that is of the user equipment when the user equipment is handed over to a cell managed by the base station; and sending, by the base station, a handover request response message including the parameter to the controller, where the handover request response message is used to instruct the controller to send a connection reconfiguration message including the parameter to the user equipment.

In a possible implementation of the eleventh aspect, the handover request message includes information about a service that is being performed by the user equipment, and the service information is used to instruct the base station to indicate the connection status information to the user equipment based on the service information.

In a possible implementation of the eleventh aspect, the service information includes a service type and a quantity of services, and the configuring, by the base station, a parameter for the user equipment based on the handover request message includes: when the quantity of services is zero, the base station indicates that the terminal device is in an idle mode; when the quantity of services is not zero, and the service type belongs to a preset service type, the base station indicates that the terminal device is in an idle mode; or when the quantity of services is not zero, and the service type does not belong to a preset service type, the base station indicates that the terminal device is in a connected mode.

In a possible implementation of the eleventh aspect, after the sending, by the base station, a handover request response message including the parameter to the controller, the method further includes: receiving, by the base station, a connection reconfiguration complete message from the user equipment; and sending, by the base station, a context release message to the controller.

According to a twelfth aspect, an embodiment of the present invention provides a handover method, including: sending, by a controller, a handover request message to a target base station, where the handover request message is used to instruct the target base station to configure a parameter for user equipment based on the handover request message, the parameter includes connection status information that is indicated by the target base station and that is of the user equipment when the user equipment is handed over to a cell managed by the target base station, and the controller has been connected to the user equipment; receiving, by the controller from the target base station, a handover request response message including the parameter; and sending, by the controller, a connection reconfiguration message including the parameter to the user equipment, where the connection reconfiguration message is used to instruct the user equipment to establish, based on the parameter and in a connection status indicated by the connection status information, a connection to the cell managed by the target base station.

In a possible implementation of the twelfth aspect, before the sending, by a controller, a handover request message to a target base station, the method further includes: receiving, by the controller, a first measurement report from the user equipment, and determining the target base station based on the first measurement report; or receiving, by the controller, a second measurement report from a transmission point TP managed by the controller, and determining the target base station based on the second measurement report.

In a possible implementation of the twelfth aspect, the handover request message includes information about a service that is being performed by the user equipment, and the service information is used to instruct the base station to indicate the connection status information to the user equipment based on the service information.

In a possible implementation of the twelfth aspect, after the sending, by the controller, a connection reconfiguration message including the parameter to the user equipment, the method further includes: receiving, by the controller, a context release message from the target base station, and releasing a context of the user equipment based on the context release message.

According to a thirteenth aspect, an embodiment of the present invention provides a handover method, including: receiving, by user equipment from a controller, a connection reconfiguration message including a parameter, where the parameter is configured by a target base station for the user equipment based on a handover request message, the parameter includes connection status information that is indicated by the target base station and that is of the user equipment when the user equipment is handed over to a cell managed by the target base station, and the user equipment is connected to the controller, and establishing, by the user equipment based on the parameter and in a connection status indicated by the connection status information, a connection to the cell managed by the target base station.

In a possible implementation of the thirteenth aspect, before the receiving, by user equipment from a controller, a connection reconfiguration message including a parameter, the method further includes: sending, by the user equipment, a first measurement report to the controller, or sending, by the user equipment, an uplink reference signal to a transmission point TP managed by the controller.

In a possible implementation of the thirteenth aspect, the handover request message includes information about a service that is being performed by the user equipment, and the service information is used to instruct the base station to indicate the connection status information to the user equipment based on the service information.

In a possible implementation of the thirteenth aspect, after the establishing, by the user equipment based on the parameter and in a connection status indicated by the connection status information, a connection to the cell managed by the target base station, the method further includes: sending, by the user equipment, a connection reconfiguration complete message to the target base station.

According to a fourteenth aspect, an embodiment of the present invention provides a base station, including: a first receiver, configured to receive a handover request message from a controller, where the base station is a target base station to which user equipment is to be handed over, and the controller has been connected to the user equipment; a processor, configured to configure a parameter for the user equipment based on the handover request message, where the parameter includes connection status information that is indicated by the base station and that is of the user equipment when the user equipment is handed over to a cell managed by the base station; and a transmitter; configured to send, under an instruction of the processor, a handover request response message including the parameter to the controller, where the handover request response message is used to instruct the controller to send a connection reconfiguration message including the parameter to the user equipment.

In a possible implementation of the fourteenth aspect, the handover request message includes information about a service that is being performed by the user equipment, and the service information is used to instruct the base station to indicate the connection status information to the user equipment based on the service information.

In a possible implementation of the fourteenth aspect, the service information includes a service type and a quantity of services, and the processor is specifically configured to: when the quantity of services is zero, indicate that the terminal device is in an idle mode; when the quantity of services is not zero, and the service type belongs to a preset service type, indicate that the terminal device is in an idle mode; or when the quantity of services is not zero, and the service type does not belong to a preset service type, indicate that the terminal device is in a connected mode.

In a possible implementation of the fourteenth aspect, the base station further includes: a second receiver, configured to receive a connection reconfiguration complete message from the user equipment. The transmitter is configured to send a context release message to the controller under an instruction of the processor.

According to a fifteenth aspect, an embodiment of the present invention provides a base station, including: a receiving module, configured to receive a handover request message from a controller, where the base station is a target base station to which user equipment is to be handed over, and the controller has been connected to the user equipment; a processing module, configured to configure a parameter for the user equipment based on the handover request message, where the parameter includes connection status information that is indicated by the base station and that is of the user equipment when the user equipment is handed over to a cell managed by the base station; and a sending module, configured to send, under an instruction of the processing module, a handover request response message including the parameter to the controller, where the handover request response message is used to instruct the controller to send a connection reconfiguration message including the parameter to the user equipment.

According to a sixteenth aspect, an embodiment of the present invention provides a controller, including: a first transmitter, configured to send a handover request message to a target base station under an instruction of a processor, where the handover request message is used to instruct the target base station to configure a parameter for user equipment based on the handover request message, the parameter includes connection status information that is indicated by the target base station and that is of the user equipment when the user equipment is handed over to a cell managed by the target base station, and the controller has been connected to the user equipment; a first receiver, configured to receive, from the target base station, a handover request response message including the parameter; and a second transmitter, configured to send, under an instruction of the processor, a connection reconfiguration message including the parameter to the user equipment, where the connection reconfiguration message is used to instruct the user equipment to establish, based on the parameter and in a connection status indicated by the connection status information, a connection to the cell managed by the target base station.

In a possible implementation of the sixteenth aspect, the controller further includes: a second receiver, configured to receive a first measurement report from the user equipment, where the processor is further configured to determine the target base station based on the first measurement report; or a second receiver, configured to receive a second measurement report from a transmission point TP managed by the controller, where the processor is further configured to determine the target base station based on the second measurement report.

In a possible implementation of the sixteenth aspect, the handover request message includes information about a service that is being performed by the user equipment, and the service information is used to instruct the base station to indicate the connection status information to the user equipment based on the service information.

In a possible implementation of the sixteenth aspect, the first receiver is further configured to receive a context release message from the target base station; and the processor is further configured to release a context of the user equipment based on the context release message.

According to a seventeenth aspect, an embodiment of the present invention provides a controller, including: a sending module, configured to send a handover request message to a target base station under an instruction of a processing module, where the handover request message is used to instruct the target base station to configure a parameter for user equipment based on the handover request message, the parameter includes connection status information that is indicated by the target base station and that is of the user equipment when the user equipment is handed over to a cell managed by the target base station, and the controller has been connected to the user equipment; a receiving module, configured to receive, from the target base station, a handover request response message including the parameter; and a sending module, further configured to send, under an instruction of the processing module, a connection reconfiguration message including the parameter to the user equipment, where the connection reconfiguration message is used to instruct the user equipment to establish, based on the parameter and in a connection status indicated by the connection status information, a connection to the cell managed by the target base station.

According to an eighteenth aspect, an embodiment of the present invention provides user equipment, including: a receiver, configured to receive, from a controller, a connection reconfiguration message including a parameter, where the parameter is configured by a target base station for the user equipment based on a handover request message, the parameter includes connection status information that is indicated by the target base station and that is of the user equipment when the user equipment is handed over to a cell managed by the target base station, and the user equipment is connected to the controller; and a processor, configured to establish, based on the parameter and in a connection status indicated by the connection status information, a connection to the cell managed by the target base station.

In a possible implementation of the eighteenth aspect, the user equipment further includes: a first transmitter, configured to send a first measurement report to the controller under an instruction of the processor; or a second transmitter, configured to send an uplink reference signal to a transmission point TP managed by the controller under an instruction of the processor.

In a possible implementation of the eighteenth aspect, the handover request message includes information about a service that is being performed by the user equipment, and the service information is used to instruct the base station to indicate the connection status information to the user equipment based on the service information.

In a possible implementation of the eighteenth aspect, the second transmitter is further configured to send a connection reconfiguration complete message to the target base station.

According to a nineteenth aspect, the present invention provides user equipment, including: a transceiver module, configured to receive, from a controller, a connection reconfiguration message including a parameter, where the parameter is configured by a target base station for the user equipment based on a handover request message, the parameter includes connection status information that is indicated by the target base station and that is of the user equipment when the user equipment is handed over to a cell managed by the target base station, and the user equipment is connected to the controller; and a processing module, configured to establish, based on the parameter and in a connection status indicated by the connection status information, a connection to the cell managed by the target base station.

According to a twentieth aspect, an embodiment of the present invention provides a communications system, including the base station according to the fourteenth aspect or the fifteenth aspect, the controller according to the sixteenth aspect or the seventeenth aspect, and the user equipment according to the eighteenth aspect or the nineteenth aspect.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1A:
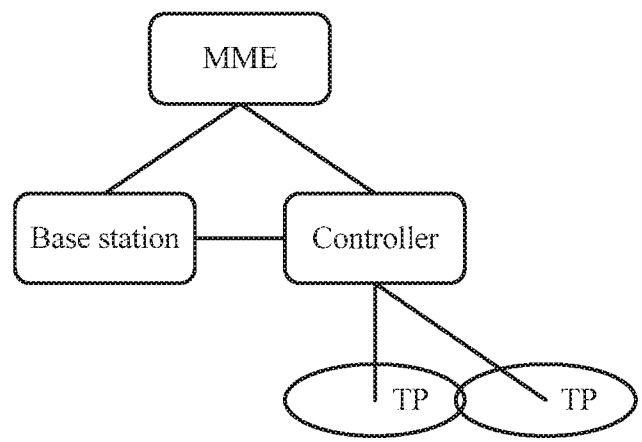
FIG. 1A is a system structure diagram of an application scenario of a handover method according to an embodiment of the present invention.
Figure 1B:
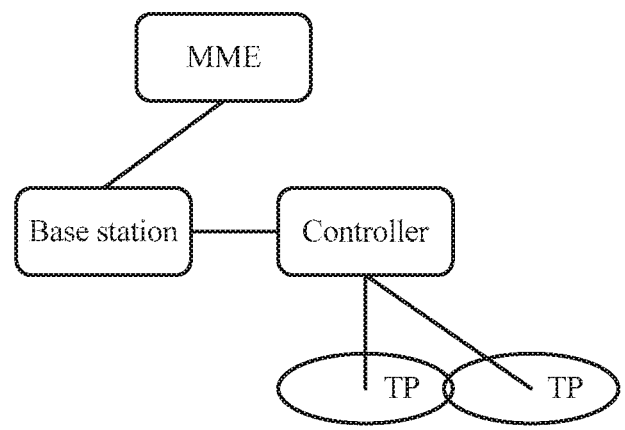
FIG. 1B is a system structure diagram of another application scenario of a handover method according to an embodiment of the present invention.
Figure 1C:
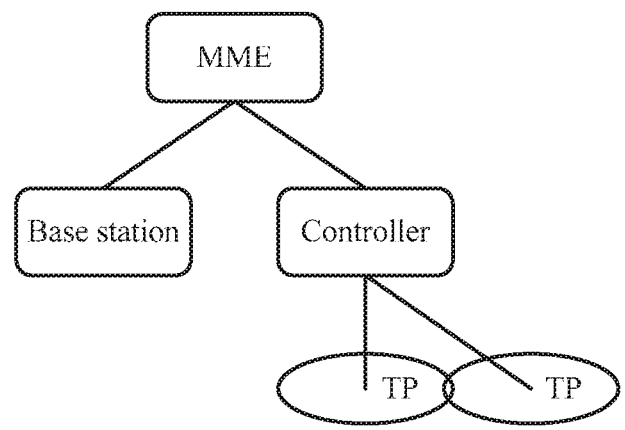
FIG. 1C is a system structure diagram of still another application scenario of a handover method according to an embodiment of the present invention.

FIG. 1A is a system structure diagram of an application scenario of a handover method according to an embodiment of the present invention. FIG. 1B is a system structure diagram of another application scenario of a handover method according to an embodiment of the present invention. FIG. 1C is a system structure diagram of still another application scenario of a handover method according to an embodiment of the present invention. A no cell system includes a controller and a plurality of TPs managed by the controller, and signals of the plurality of TPs cover a hyper cell. FIG. 1A to FIG. 1C each show a no cell system including one controller and two TPs. In the application scenario in FIG. 1A, there is an interface between the controller and a base station, and there is an interface between a mobility management entity (Mobility Management Entity, MME for short) and the controller. In the application scenario in FIG. 1B, there is an interface between the controller and a base station, and there is no interface between an MME and the controller. In the application scenario in FIG. 1C, there is no interface between the controller and a base station, but there is an interface between an MME and the controller.

In the no cell system, the controller manages a radio resource of the hyper cell. User equipment may access the controller by accessing the TPs managed by the controller. Downlink data transmission is used as an example. The controller sends data to a TP selected by the controller for the user equipment, and then the TP sends the data to the user equipment.

Two states of the user equipment in an LTE cell are not in a one-to-one correspondence with two states of the user equipment in the hyper cell. A connected mode of the user equipment in the LTE cell may be corresponding to both an active mode and an ECO mode of the user equipment in the hyper cell, and the ECO mode of the user equipment in the hyper cell may be corresponding to both the connected mode and an idle mode of the user equipment in the LTE cell.

The handover method provided in this embodiment of the present invention is applied to a scenario in which the user equipment is handed over between a cell managed by the base station and a cell managed by the controller in the no cell system. Therefore, the user equipment is handed over to another cell in a proper connection status, service continuity of the user equipment in a moving process is implemented, and a throughput of the user equipment is improved.

The base station in this embodiment of the present invention may be a base station in Universal Mobile Telecommunications System (Universal Mobile Telecommunications System. UMTS for short), or may be an evolved NodeB in LTE, or may be a base station in a New Radio access technology (New Radio Access Technology, NR for short). The user equipment in the embodiments of this application may be a wireless terminal or a wired terminal. The wireless terminal may be a device that provides a user with voice and/or data connectivity, a handheld device with a radio connection function, or another processing device connected to a radio modem. The wireless terminal may communicate with one or more core networks through a radio access network (such as RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (Personal Communications Service, PCS for short) phone, a cordless telephone set, a Session Initiation Protocol (SIP) phone, a wireless local loop (Wireless Local Loop, WLL for short) station, or a personal digital assistant (Personal Digital Assistant, PDA for short). The wireless terminal may also be referred to as a system, a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

Figure 2:
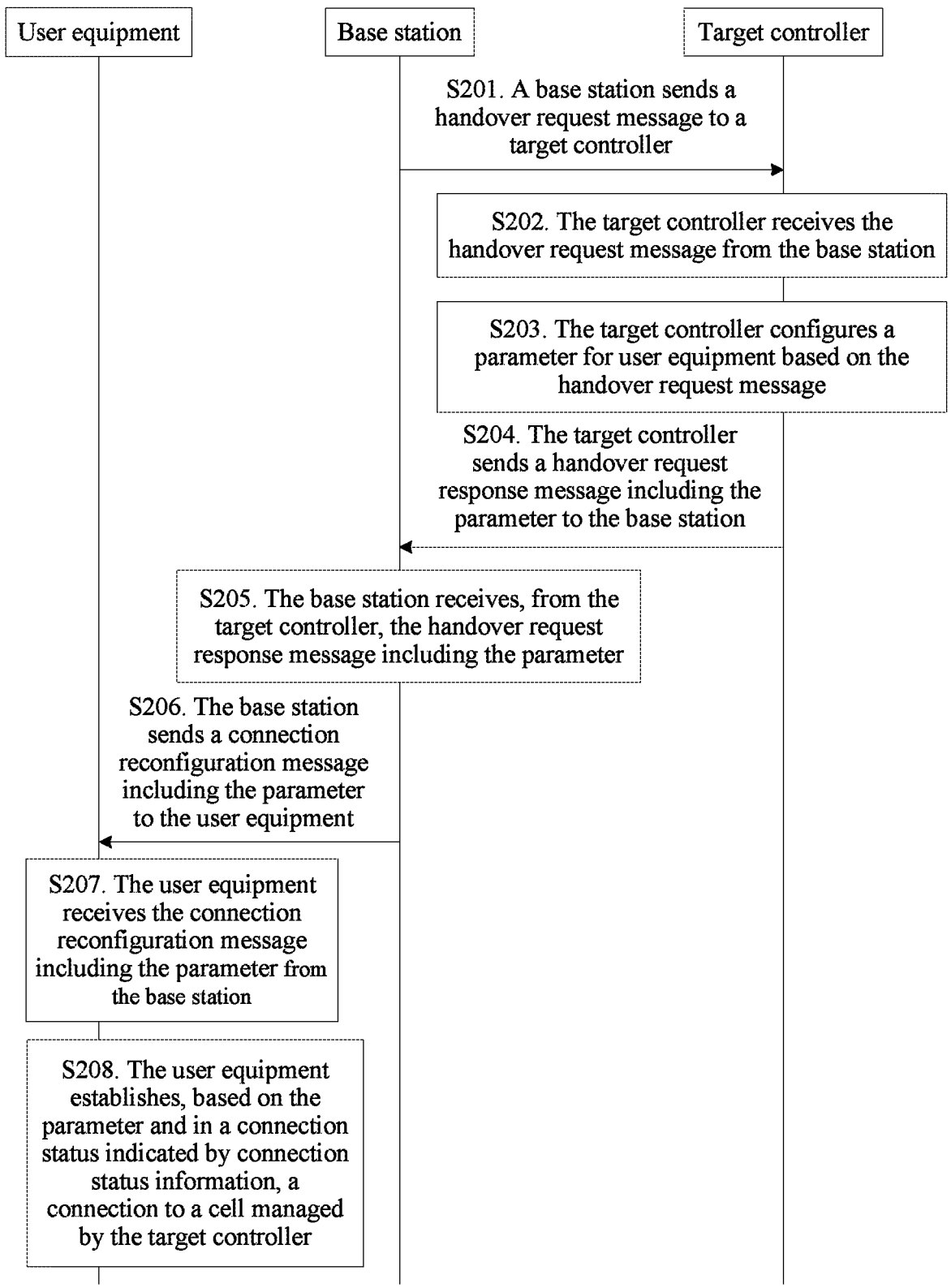
FIG. 2 is a signaling interaction diagram of Embodiment 1 of a handover method according to an embodiment of the present invention.

FIG. 2 is a signaling interaction diagram of Embodiment 1 of a handover method according to an embodiment of the present invention. As shown in FIG. 2, the handover method provided in this embodiment of the present invention is applied to a scenario in which user equipment is handed over from a base station to a target controller, and includes the following steps.

S201. The base station sends a handover request message to the target controller.

The handover request message is used to instruct the target controller to configure a parameter for the user equipment based on the handover request message. The parameter includes connection status information that is indicated by the target controller and that is of the user equipment when the user equipment is handed over to a cell managed by the target controller. The base station has been connected to the user equipment.

Specifically, in this embodiment of the present invention, the user equipment has accessed the base station and performed data transmission. When the user equipment meets a handover condition in a moving process, the base station sends the handover request message to the target controller.

It may be understood that the target controller in this embodiment of the present invention may be the controller in the no cell system shown in FIG. 1A to 1C. The target controller manages a plurality of TPs.

In an implementation, the base station may select the target controller on its own. For example, the base station stores addresses of controllers in all no cell systems that are geographically adjacent to the base station. When detecting that the user equipment meets the handover condition, the base station selects a geographically adjacent controller with a best coverage signal as the target controller. In another implementation, when the user equipment meets the handover condition, an MME may designate a controller as the target controller to which the user equipment is to be handed over. In still another implementation, the base station may determine the target controller based on a measurement report sent by the user equipment. This is not limited in this embodiment of the present invention.

S202. The target controller receives the handover request message from the base station.

S203. The target controller configures a parameter for the user equipment based on the handover request message.

The parameter includes the connection status information that is indicated by the target controller and that is of the user equipment when the user equipment is handed over to the cell managed by the target controller.

Specifically, in an implementation, the handover request message includes bearer information of the user equipment. The bearer information is used to instruct the target controller to indicate the connection status information to the user equipment based on the bearer information. The target controller may configure the connection status information in the parameter for the user equipment based on the bearer information in the handover request message.

S204. The target controller sends a handover request response message including the parameter to the base station.

The handover request response message is used to instruct the base station to send a connection reconfiguration message including the parameter to the user equipment.

Specifically, the target controller may encapsulate the parameter in the handover request response message, and send the handover request response message to the base station.

S205. The base station receives, from the target controller, the handover request response message including the parameter.

S206. The base station sends a connection reconfiguration message including the parameter to the user equipment.

The connection reconfiguration message is used to instruct the user equipment to establish, based on the parameter and in a connection status indicated by the connection status information, a connection to the cell managed by the target controller.

Specifically, after receiving the handover request response message that includes the parameter and that is sent by the target controller, the base station parses the handover request response message to obtain the parameter. Then the parameter is encapsulated in the connection reconfiguration message and sent to the user equipment. The connection reconfiguration message herein may be a radio resource control (Radio Resource Control, RRC for short) connection reconfiguration message, or may be another configuration message. This is not limited in this embodiment of the present invention.

S207. The user equipment receives the connection reconfiguration message including the parameter from the base station.

The parameter is configured by the target controller for the user equipment based on the handover request message. The parameter includes the connection status information that is indicated by the target controller and that is of the user equipment when the user equipment is handed over to the cell managed by the target controller.

S208. The user equipment establishes, based on the parameter and in a connection status indicated by connection status information, a connection to a cell managed by the target controller.

Specifically, after receiving the connection reconfiguration message, the user equipment performs configuration based on the parameter in the connection reconfiguration message. The parameter may include information other than the connection status information. The user equipment performs configuration based on the connection status information in the parameter and the other information in the parameter. Finally, the user equipment establishes, in the connection status indicated by the connection status information, the connection to the cell managed by the target controller. Certainly, the user equipment may establish, in another manner based on the parameter and in the connection status indicated by the connection status information, the connection to the cell managed by the target controller. This is not limited in this embodiment of the present invention. After the user equipment accesses the cell managed by the target controller, the target controller may select a target TP from the TP for the user equipment, and the user equipment may communicate with a core network by using the target TP and the target controller, so that the user equipment is handed over from the base station to the cell managed by the target controller.

It should be noted that, according to the handover method provided in this embodiment of the present invention, in the scenarios shown in FIG. 1A and FIG. 1B, when there is an interface between the base station and the controller, information may be directly exchanged between the base station and the controller.

In the scenario shown in FIG. 1C, when there is no interface between the base station and the controller, information is exchanged between the base station and the controller through an MME.

In a first implementation, when the base station and the target controller belong to a same MME, that the base station sends a handover request message to the target controller in S201 includes the following steps: The base station first sends the handover request message to the MME, and the MME receives the handover request message and forwards the handover request message to the target controller. That the target controller sends a handover request response message including the parameter to the base station in S204 includes the following steps: The target controller first sends the handover request response message to the MME, and the MME receives the handover request response message and forwards the handover request response message to the base station.

In a second implementation, when the base station and the target controller belong to different MMEs, that the base station sends a handover request message to the target controller in S201 includes the following steps: The base station first sends the handover request message to an MME corresponding to the base station, the MME receives the handover request message and forwards the handover request message to an MME corresponding to the target controller, and then the MME corresponding to the target controller forwards the handover request message to the target controller. That the target controller sends a handover request response message including the parameter to the base station in S204 includes the following steps: The target controller first sends the handover request response message to an MME corresponding to the target controller, the MME receives the handover request response message and forwards the handover request response message to an MME corresponding to the base station, and then the MME corresponding to the base station forwards the handover request response message to the base station.

According to the handover method provided in this embodiment of the present invention, the base station sends the handover request message to the target controller. After receiving the handover request message from the base station, the target controller configures, based on the handover request message, the parameter including the connection status information for the user equipment, and then sends the handover request response message including the parameter to the base station. After receiving, from the target controller, the handover request response message including the parameter, the base station sends the connection reconfiguration message including the parameter to the user equipment. The user equipment receives the connection reconfiguration message including the parameter from the base station, and establishes, based on the parameter and in the connection status indicated by the connection status information, the connection to the cell managed by the target controller. In this way, the base station actively sends a handover request, the target controller configures, based on the handover request, the parameter including the connection status information for the user equipment, and the user equipment establishes, based on the parameter and in the connection status indicated by the connection status information, the connection to the cell managed by the target controller. Therefore, the user equipment is handed over, in a proper connection status, from a cell managed by the base station to a cell managed by the target controller, service continuity of the user equipment in a moving process is implemented, and a throughput of the user equipment is improved.

FIG. 3A to FIG. 3D are a signaling interaction diagram of Embodiment 2 of a handover method according to an embodiment of the present invention. According to the handover method provided in this embodiment of the present invention, based on the handover method shown in FIG. 2, a step before a base station sends a handover request message to a target controller and a step after a user establishes, based on a parameter and in a connection status indicated by connection status information, a connection to a cell managed by the target controller are described in detail. As shown in FIG. 3A to FIG. 3D, the handover method provided in this embodiment of the present invention includes the following steps.

S301. User equipment sends a measurement report to a base station.

Specifically, after a measurement event is met, the user equipment sends the measurement report to the base station. The measurement report includes a measurement value of a reference signal sent by the user equipment to a hyper cell in a no cell system adjacent to the base station. Specifically, the measurement report may be received strength or received quality of the reference signal, or may be another measurement value. This is not limited in the present invention. There may be a plurality of no cell systems adjacent to the base station, and therefore the measurement report may include measurement values of reference signals sent by the user equipment to hyper cells in the plurality of no cell systems.

S302. The base station receives the measurement report from the user equipment, and determines a target controller based on the measurement report.

Specifically, after the base station receives the measurement report, in a possible implementation, the base station may compare a measurement value of a reference signal of the base station with the measurement values that are of the reference signals in the plurality of no cell systems and that are measured by the user equipment in the measurement report, and select a controller in a no cell system with maximum reference signal strength or best reference signal quality measured by the user equipment as the target controller.

S301 and S302 are optional steps.

S303. The base station sends a handover request message to the target controller.

S304. The target controller receives the handover request message from the base station.

S305. The target controller configures a parameter for the user equipment based on the handover request message.

Specifically, the handover request message in this embodiment of the present invention includes bearer information of the user equipment, and the target controller may specifically configure the parameter for the user equipment based on the bearer information of the user equipment in the handover request message.

In this embodiment of the present invention, the parameter may include connection status information that is indicated by the target controller and that is of the user equipment when the user equipment is handed over to a cell managed by the target controller, and the parameter may further include a first uplink reference signal and a channel used to send the first uplink reference signal, a second uplink reference signal and a channel used to send the second uplink reference signal, and an access sequence and a channel used to send the access sequence. In addition, the parameter may further include parameters such as a dedicated connection identifier (Dedicated Connection Identifier, DCID for short) configured by the target controller for the user equipment, a period for sending the first uplink reference signal, and a period for sending the second uplink reference signal.

The first uplink reference signal may be a sounding reference signal (Sounding Reference Signal, SRS for short), and the second uplink reference signal may be a tracking (tracking) signal. The access sequence is used by the user equipment to perform random access on the target controller. First connection status information may include first connection status information or second connection status information. The first connection status information is used to instruct the user equipment to establish, in a first connection status indicated by the first connection status information, a connection to the cell managed by the target controller. The second connection status information is used to instruct the user equipment to establish, in a second connection status indicated by the second connection status information, a connection to the cell managed by the target controller. The first connection status may be an active mode, and the second connection status may be an ECO mode. The target controller may determine, based on the bearer information of the user equipment, whether a status of the user equipment in the cell managed by the target controller is the ECO mode or the active mode. As described above, different uplink reference signals are sent at different frequency in the ECO mode and the active mode. Further, the ECO mode and the active mode support different service types. In the active mode, the user equipment can support scheduling data transmission. In the ECO mode, compared with the active mode, the user equipment can save more power, and support only a background service or a grant-free (grant-free) service.

In the first connection status, the user equipment sends, at preset first frequency through the channel used to send the first uplink reference signal, the first uplink reference signal to a TP managed by the target controller. In the second connection status, the user equipment sends, at preset second frequency through the channel used to send the second uplink reference signal, the second uplink reference signal to the TP of the target controller. In addition, the preset first frequency is greater than the preset second frequency.

S306. The target controller sends a handover request response message including the parameter to the base station.

The handover request response message is used to instruct the base station to send a connection reconfiguration message including the parameter to the user equipment.

S307. The base station receives, from the target controller, the handover request response message including the parameter.

S308. The base station sends a connection reconfiguration message including the parameter to the user equipment.

S309. The user equipment receives the connection reconfiguration message including the parameter from the base station.

An implementation process and a technical principle of S306 to S309 are similar to those of S204 to S207, and details are not described herein again.

S310. The base station sends a sequence number status to the target controller.

The sequence number status (SN status) is used to indicate a data transmission progress of the user equipment. Specifically, the sequence number status is used to indicate, to the target controller, data that is not successfully sent to the user equipment.

S311. The target controller receives the sequence number status from the base station, and determines a data transmission progress of the user equipment based on the sequence number status.

Specifically, after receiving the handover request response message sent by the target controller, the base station sends the sequence number status to the target controller. The sequence number status indicates a Packet Data Convergence Protocol (Packet Data Convergence Protocol, PDCP for short) sequence number, and is used to notify the target controller of a PDCP that is successfully sent and a PDCP that is not sent. The base station may determine the sequence number status based on a data transmission status of the user equipment. After determining the data transmission progress of the user equipment, the target controller may continue to perform, after the user equipment is successfully handed over, data transmission with the user equipment based on the data transmission progress that is determined based on the sequence number status, so as to ensure service continuity of the user equipment.

S310 and S311 are optional steps.

S312. The user equipment sends, at preset first frequency through a channel used to send a first uplink reference signal, the first uplink reference signal to TPs; or the user equipment sends, at preset second frequency through a channel used to send a second uplink reference signal, the second uplink reference signal to TPs.

Specifically, when the connection status information is the first connection status information, the user equipment sends, at the preset first frequency through the channel used to send first uplink reference, the first uplink reference signal to the TPs.

When the connection status information is the second connection status information, the user equipment sends, at the preset second frequency through the channel used to send the second uplink reference signal, the second uplink reference signal to the TPs.

In this embodiment, as shown in FIG. 3A to FIG. 3D, an example in which the target controller manages a TP 1 and a TP 2 is used for description.

S313. The TPs determine a measurement report after receiving the first uplink reference signal or the second uplink reference signal.

S314. The TPs send the measurement report to the target controller.

S315. The target controller receives the measurement reports from the TPs, and determines a target TP in the TPs based on the measurement reports.

The measurement report is generated after the TP receives the first uplink reference signal or the second uplink reference signal sent by the user equipment.

In this embodiment, an example in which the target TP is the TP 1 is used for description.

S316. The target controller sends an indication configuration message to the target TP.

The indication configuration message is used to instruct the target TP to perform data transmission with the user equipment.

S317. The target TP sends an access response message to the user equipment.

S318. The user equipment receives the access response message from the target TP in the TPs.

S319. The user equipment sends a connection reconfiguration complete message to the target TP.

S320. The target TP sends a connection complete indication message to the target controller.

After receiving the connection reconfiguration complete message sent by the user equipment, the target TP sends the connection complete indication message to the target controller.

S321. The target controller receives the connection complete indication message from the target TP.

The connection complete indication message is used to indicate that the user equipment is connected to the target TP. The connection complete indication message is sent by the target TP to the target controller after the target TP receives the connection reconfiguration complete message sent by the user equipment.

S322. The target controller sends a context release message to the base station.

S323. The base station receives the context release message from the target controller, and releases a context of the user equipment based on the context release message.

In the foregoing process, when the connection status information indicates that the user equipment of the target controller is in the first connection status, it indicates that the user equipment of the base station performs a normal service other than the background service and the grant-free service, and sends, at the preset first frequency through the channel used to send the first uplink reference signal, the first uplink reference signal to the TPs managed by the target controller. The preset first frequency may be determined based on frequency at which the user equipment in the active mode reports an uplink reference signal in the no cell system.

When the connection status information indicates that the user equipment of the target controller is in the second connection status, it indicates that the user equipment of the base station performs the background service or the grant-free (grant-free) service, and sends, at the preset second frequency through the channel used to send the second uplink reference signal, the second uplink reference signal to the TPs managed by the target controller. The preset second frequency may be determined based on frequency at which the user equipment in the ECO mode reports an uplink reference signal in the no cell system.

In this way, when the user equipment of the base station performs the background service or the grant-free service and then is handed over to the cell managed by the target controller, the user equipment directly enters the ECO mode instead of entering the active mode before the ECO mode, so as to reduce power consumption of the user equipment.

It should be noted that, according to the handover method provided in this embodiment of the present invention, in the scenarios shown in FIG. 1A and FIG. 1B, when there is an interface between the base station and the controller, information may be directly exchanged between the base station and the controller.

In the scenario shown in FIG. 1C, when there is no interface between the base station and the controller, information is exchanged between the base station and the controller through an MME. A specific forwarding manner is similar to the two forwarding implementations in the embodiment in FIG. 2, and details are not described herein again.

It should be noted that, when establishing the connection to the cell managed by the target controller, the user equipment may first send, through the channel used to send the access sequence, the access sequence to the TPs managed by the target controller, and the TPs generate the measurement reports based on the access sequence, and send the measurement reports to the target controller. The target controller determines the target TP in the TPs based on the measurement reports. Then, the terminal device directly sends the first uplink reference signal or the second uplink reference signal to the target TP.

According to the handover method provided in this embodiment of the present invention, after receiving the context release message sent by the target controller, the base station releases the context of the user equipment based on the context release message, so as to save an air interface resource. In addition, the user equipment may determine, based on the connection status information, a type of an uplink reference signal and frequency at which the uplink reference signal is sent to the TP of the target controller. When the user equipment of the base station performs the background service or the grant-free service and then is handed over to the cell managed by the target controller, the user equipment directly enters the second connection status, so as to reduce power consumption of the user equipment.

Figure 4:
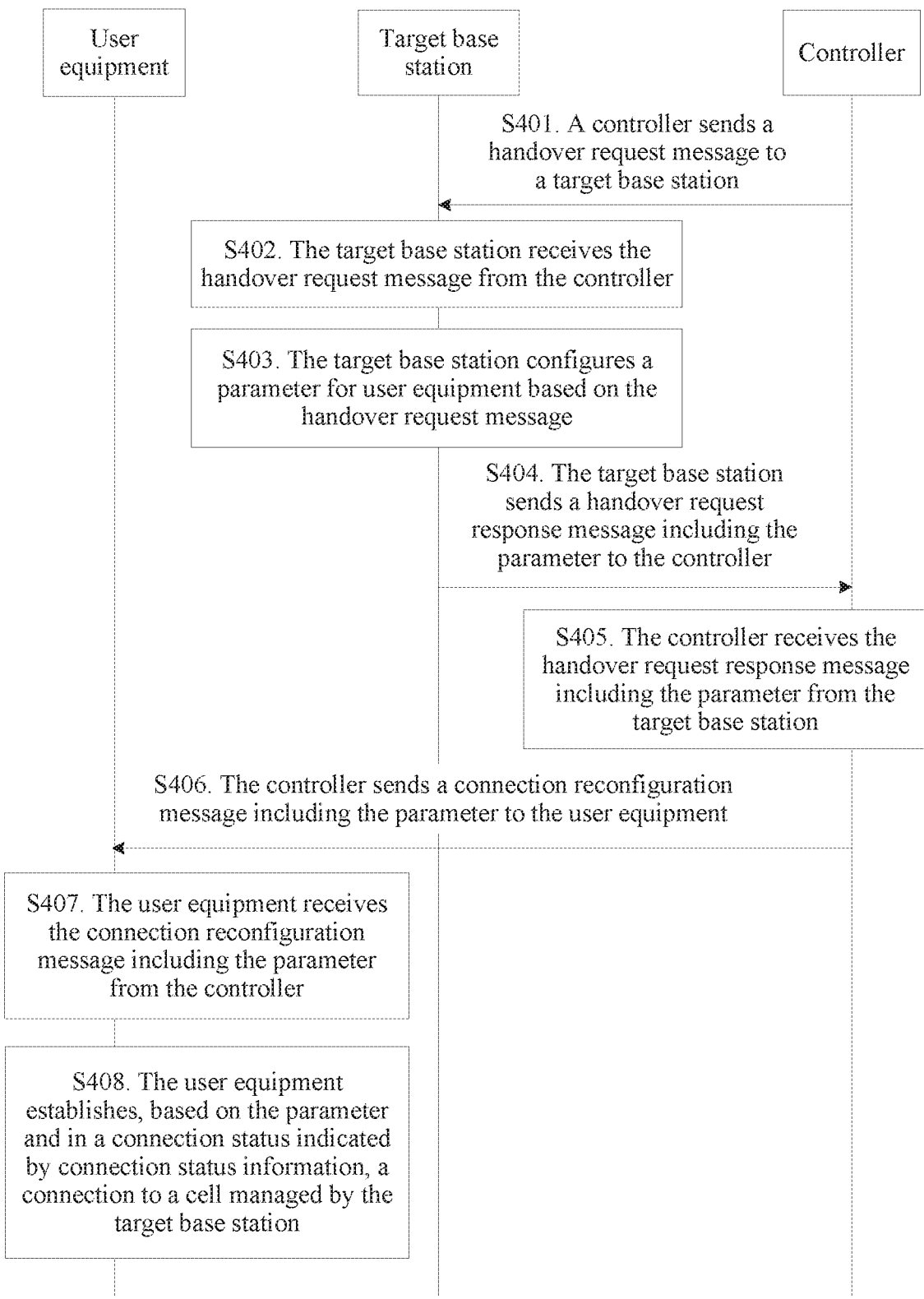
FIG. 4 is a signaling interaction diagram of Embodiment 3 of a handover method according to an embodiment of the present invention.

FIG. 4 is a signaling interaction diagram of Embodiment 3 of a handover method according to an embodiment of the present invention. As shown in FIG. 4, the handover method provided in this embodiment of the present invention is applied to a scenario in which user equipment is handed over from a controller to a target base station, and includes the following steps.

S401. The controller sends a handover request message to the target base station.

The handover request message is used to instruct the target base station to configure a parameter for the user equipment based on the handover request message. The parameter includes connection status information that is indicated by the target base station and that is of the user equipment when the user equipment is handed over to a cell managed by the target base station. The controller has been connected to the user equipment.

Specifically, in this embodiment of the present invention, the user equipment has accessed the controller and performed data transmission. When the user equipment meets a handover condition in a moving process, the controller sends the handover request message to the target base station.

In an implementation, the controller may select the target base station on its own. For example, the controller stores addresses of all base stations that are geographically adjacent to the controller. When detecting that the user equipment meets the handover condition, the controller selects a geographically adjacent base station with a best coverage signal as the target base station. In another implementation, when the user equipment meets the handover condition, an MME may designate a base station as the target base station to which the user equipment is to be handed over. In still another implementation, the controller may determine the target base station based on a measurement report sent by the user equipment. This is not limited in this embodiment of the present invention.

S402. The target base station receives the handover request message from the controller.

S403. The target base station configures a parameter for the user equipment based on the handover request message.

Specifically, in an implementation, the handover request message includes information about a service that is being performed by the user equipment. The service information is used to instruct the target base station to indicate the connection status information to the user equipment based on the service information. The target base station may configure the parameter for the user equipment based on the service information in the handover request message.

S404. The target base station sends a handover request response message including the parameter to the controller.

Specifically, the target base station may encapsulate the parameter in the handover request response message, and send the handover request response message to the controller. The handover request response message is used to instruct the controller to send a connection reconfiguration message including the parameter to the user equipment.

S405. The controller receives the handover request response message including the parameter from the target base station.

S406. The controller sends a connection reconfiguration message including the parameter to the user equipment.

The connection reconfiguration message is used to instruct the user equipment to establish, based on the parameter and in a connection status indicated by the connection status information, a connection to the cell managed by the target base station.

Specifically, after receiving the handover request response message that includes the parameter and that is sent by the target base station, the controller parses the handover request response message to obtain the parameter. Then the parameter is encapsulated in the connection reconfiguration message and sent to the user equipment. The connection reconfiguration message herein may be an RRC connection reconfiguration message, or may be another configuration message. This is not limited in this embodiment of the present invention.

S407. The user equipment receives the connection reconfiguration message including the parameter from the controller.

The parameter is configured by the target base station for the user equipment based on the handover request message. Specifically, the controller may send the connection reconfiguration message to a TP connected to the user equipment, and then the TP sends the connection reconfiguration message to the user equipment.

S408. The user equipment establishes, based on the parameter and in a connection status indicated by connection status information, a connection to a cell managed by the target base station.

Specifically, after receiving the connection reconfiguration message, the user equipment performs configuration based on the parameter in the connection reconfiguration message. The parameter may include information other than the connection status information. The user equipment performs configuration based on the connection status information in the parameter and the other information in the parameter. Finally, the user equipment establishes, in the connection status indicated by the connection status information, the connection to the cell managed by the target base station. Certainly, the user equipment may further establish, in another manner based on the parameter and in the connection status indicated by the connection status information, the connection to the cell managed by the target base station. This is not limited in this embodiment of the present invention.

It should be noted that, according to the handover method provided in this embodiment of the present invention, in the scenarios shown in FIG. 1A and FIG. 1B, when there is an interface between the base station and the controller, information may be directly exchanged between the base station and the controller.

In the scenario shown in FIG. 1C, when there is no interface between the base station and the controller, information is exchanged between the base station and the controller through an MME.

In a first implementation, when the target base station and the controller belong to a same MME, that the controller sends a handover request message to the target base station in S401 includes the following steps: The controller first sends the handover request message to the MME, and the MME receives the handover request message and forwards the handover request message to the target base station. That the target base station sends a handover request response message including the parameter to the controller in S404 includes the following steps: The target base station first sends the handover request response message to the MME, and the MME receives the handover request response message and forwards the handover request response message to the controller.

In a second implementation, when the target base station and the controller belong to different MMEs, that the controller sends a handover request message to the target base station in S401 includes the following steps: The controller first sends the handover request message to an MME corresponding to the controller, the MME receives the handover request message and forwards the handover request message to an MME corresponding to the target base station, and then the MME corresponding to the target base station forwards the handover request message to the target base station. That the target base station sends a handover request response message including the parameter to the controller in S404 includes the following steps: The target base station first sends the handover request response message to an MME corresponding to the target base station, the MME receives the handover request response message and forwards the handover request response message to an MME corresponding to the controller, and then the MME corresponding to the controller forwards the handover request response message to the controller.

According to the handover method provided in this embodiment of the present invention, the controller sends the handover request message to the target base station. After receiving the handover request message sent by the controller, the target base station configures, based on the handover request message, the parameter for the user equipment, and then sends the handover request response message including the parameter to the controller. The controller receives the handover request response message including the parameter sent by the target base station, and sends the connection reconfiguration message including the parameter to the user equipment. After the user equipment receives the connection reconfiguration message including the parameter sent by the controller, the user equipment establishes, based on the parameter and in the connection status indicated by the connection status information, the connection to the cell managed by the target base station. In this way, the controller actively sends a handover request, the target base station configures, based on the handover request, the parameter including the connection status information for the user equipment, and the user equipment establishes, based on the parameter and in the connection status indicated by the connection status information, the connection to the cell managed by the target base station. Therefore, the user equipment is handed over, in a proper connection status, from a cell managed by the controller to a cell managed by the target base station, service continuity of the user equipment in a moving process is implemented, and a throughput of the user equipment is improved.

Figure 5A:
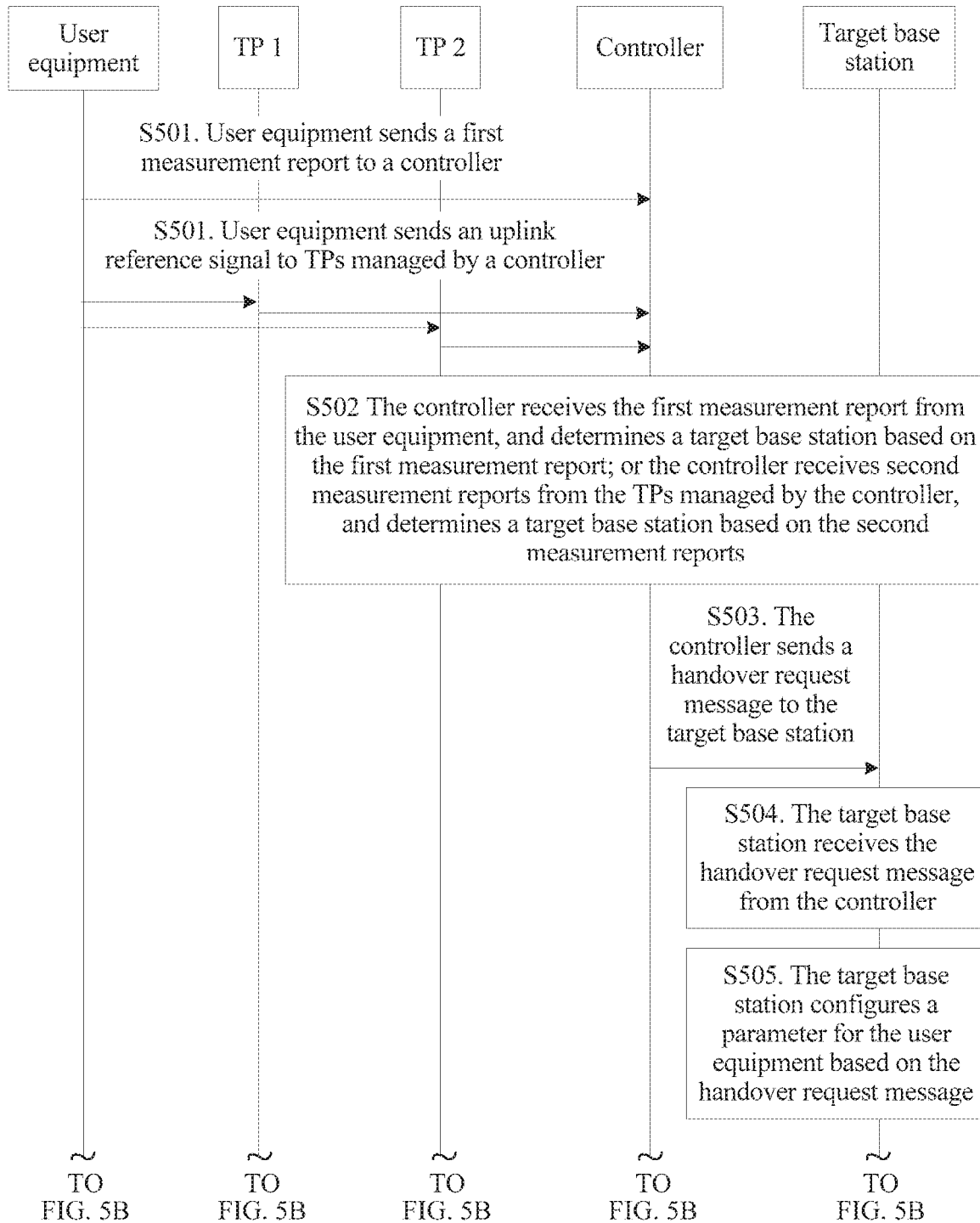
FIG. 5A to FIG. 5C are a signaling interaction diagram of Embodiment 4 of a handover method according to an embodiment of the present invention.
Figure 5B:
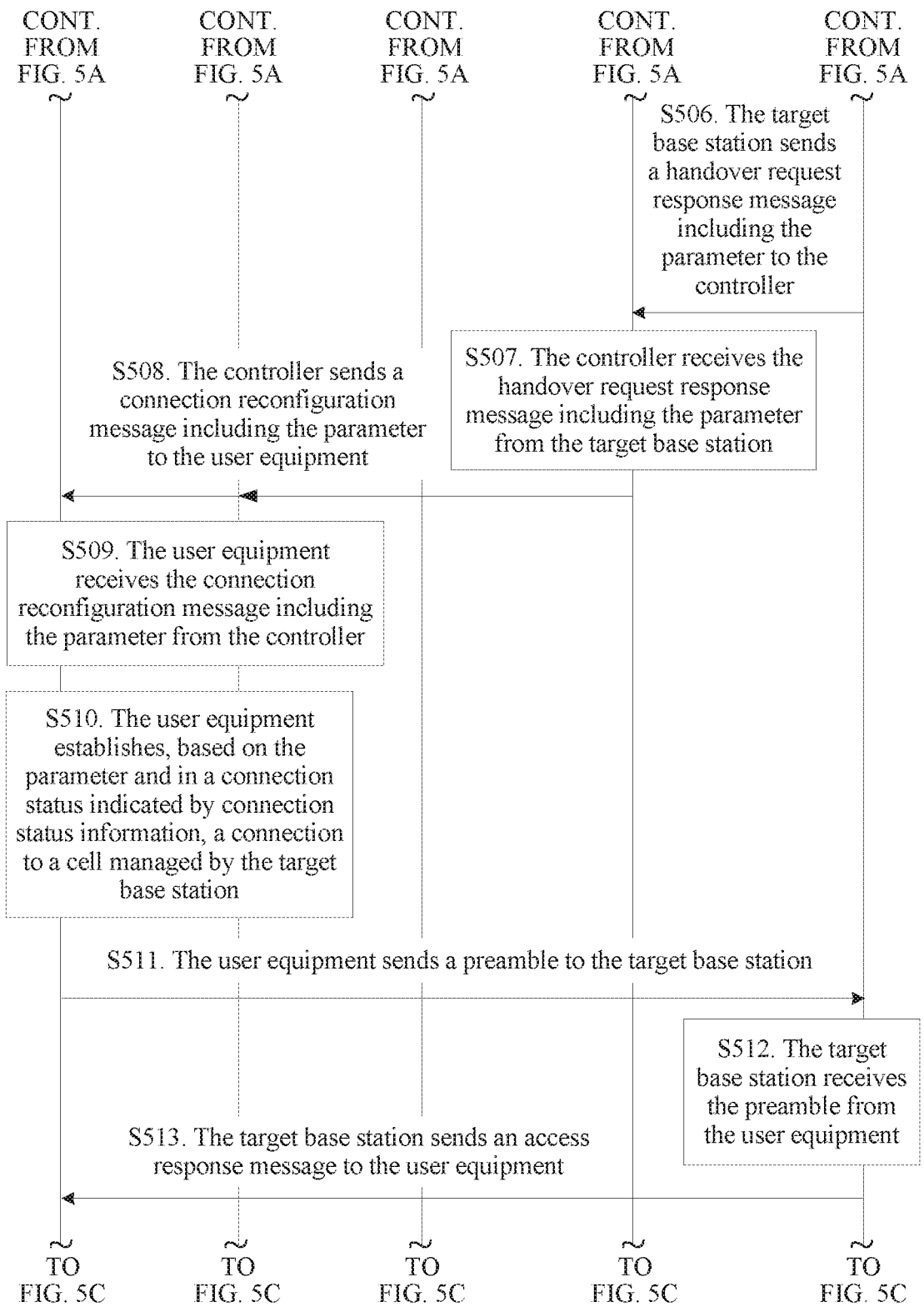
Figure 5C:
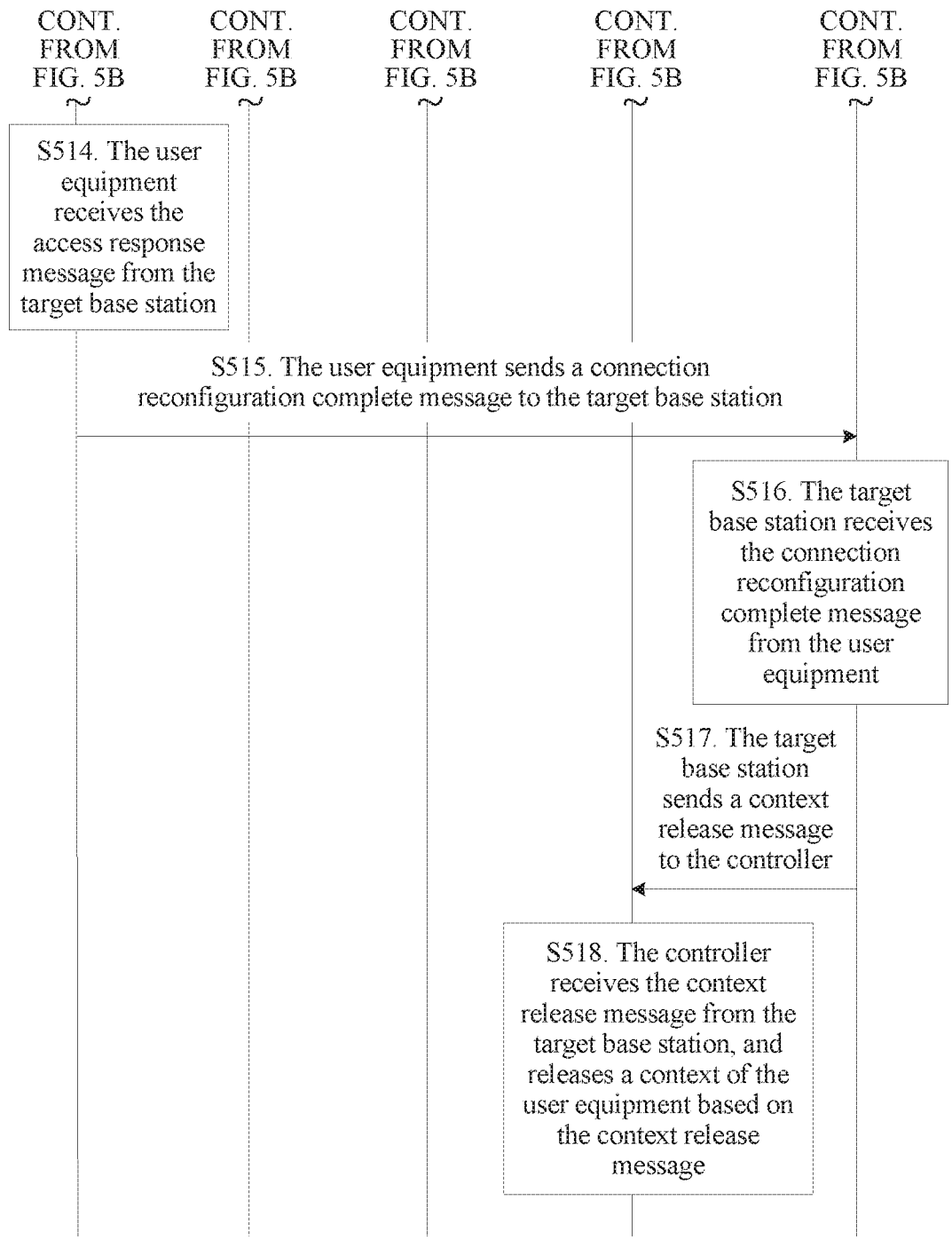

FIG. 5A to FIG. 5C are a signaling interaction diagram of Embodiment 4 of a handover method according to an embodiment of the present invention. According to the handover method provided in this embodiment of the present invention, based on the handover method shown in FIG. 4, a step before a controller sends a handover request message to a target base station and a step after user equipment establishes, based on a parameter and in a connection status indicated by connection status information, a connection to a cell managed by the target base station are described in detail. As shown in FIG. 5A to FIG. 5C, the handover method provided in this embodiment of the present invention includes the following steps.

S501. User equipment sends a first measurement report to a controller; or user equipment sends an uplink reference signal to TPs managed by a controller.

When the user equipment of the controller is in an active mode, the user equipment may send an SRS signal to the TPs. When the user equipment of the controller is in an ECO mode, the user equipment may send a tracking signal to the TPs.

S502. The controller receives the first measurement report from the user equipment, and determines a target base station based on the first measurement report; or the controller receives second measurement reports from the TPs managed by the controller, and determines a target base station based on the second measurement reports.

In this embodiment of the present invention, the controller may determine the target base station in two implementations.

In one implementation, the controller receives the first measurement report sent by the user equipment, and determines the target base station based on the first measurement report.

In the other implementation, the controller receives the second measurement reports from the TPs, and determines the target base station based on the second measurement reports. Specifically, it is assumed that there are three TPs managed by the controller, each TP is adjacent to one base station. The user equipment sends uplink reference signals to the TPs managed by the controller. After receiving the uplink reference signals, the TPs generate second measurement reports, and send the second measurement reports to the controller. The controller may obtain, through modeling, a movement track of the user equipment based on these second measurement reports, and determine a base station that is adjacent to a TP toward which the user equipment is moving as the target base station.

S503. The controller sends a handover request message to the target base station.

S504. The target base station receives the handover request message from the controller.

S505. The target base station configures a parameter for the user equipment based on the handover request message.

The parameter includes connection status information. A connection status indicated by the connection status information includes a connected mode and an idle mode.

The handover request message includes information about a service that is being performed by the user equipment. The service information is used to instruct the target base station to indicate the connection status information to the user equipment based on the service information. The service information may include a service type and a quantity of services.

In a possible implementation, if the user equipment of the controller is in the ECO mode and has no service, or the user equipment is in the ECO mode and has only grant-free data transmission, the target base station may consider that the user equipment of the target base station does not need to enter the connected mode. In this case, the target base station instructs the user equipment to enter the idle mode. Otherwise, the target base station instructs the user equipment to enter the connected mode, or the target base station indicates nothing, and the user equipment enters the connected mode by default. It should be noted that this embodiment is merely an example for description. When the user equipment is in the ECO mode and has no service or has only grant-free data transmission, the target base station may instruct the user equipment to enter the idle mode. However, this is not limited thereto. It is a specific implementation of the base station.

In another possible implementation, that the target base station configures a parameter for the user equipment based on the handover request message includes the following steps: When the quantity of services is zero, the target base station indicates that the terminal device is in the idle mode; when the quantity of services is not zero, and the service type belongs to a preset service type, the target base station indicates that the terminal device is in the idle mode; or when the quantity of services is not zero, and the service type does not belong to a preset service type, the target base station indicates that the terminal device is in the connected mode. The preset service type herein may be a background service, a grant-free data transmission service, and the like.

S506. The target base station sends a handover request response message including the parameter to the controller.

The handover request response message is used to instruct the controller to send a connection reconfiguration message including the parameter to the user equipment.

S507. The controller receives the handover request response message including the parameter from the target base station.

S508. The controller sends a connection reconfiguration message including the parameter to the user equipment.

S509. The user equipment receives the connection reconfiguration message including the parameter from the controller.

S510. The user equipment establishes, based on the parameter and in a connection status indicated by connection status information, a connection to a cell managed by the target base station.

S511. The user equipment sends a preamble to the target base station.

When status indication information in the parameter is the connected mode, the user equipment sends the preamble (preamble) to the target base station, so as to perform random access.

S512. The target base station receives the preamble from the user equipment.

S513. The target base station sends an access response message to the user equipment.

S514. The user equipment receives the access response message from the target base station.

S515. The user equipment sends a connection reconfiguration complete message to the target base station.

S516. The target base station receives the connection reconfiguration complete message from the user equipment.

S517. The target base station sends a context release message to the controller.

S518. The controller receives the context release message from the target base station, and releases a context of the user equipment based on the context release message.

It should be noted that, when the status indication information in the parameter is the idle mode, steps S510 to S517 are not performed, and the controller directly releases the context of the user equipment after S508.

According to the handover method provided in this embodiment of the present invention, when the user equipment of the controller is in the ECO mode, and a background service or a grant-free service is being performed, the user equipment may access the base station in the connected mode. The user equipment directly enters the connected mode without the need of entering the idle mode when accessing the target base station, thereby ensuring service continuity of the user equipment, and reducing signaling overheads.

It should be noted that, according to the handover method provided in this embodiment of the present invention, in the scenarios shown in FIG. 1A and FIG. 1B, when there is an interface between the base station and the controller, information may be directly exchanged between the base station and the controller.

In the scenario shown in FIG. 1C, when there is no interface between the base station and the controller, information is exchanged between the base station and the controller through an MME. A specific forwarding implementation is similar to the forwarding manners in the embodiment in FIG. 4, and details are not described herein again.

According to the handover method provided in this embodiment of the present invention, after receiving the context release message sent by the target base station, the controller releases the context of the user equipment based on the context release message, so as to save an air interface resource. In addition, when the user equipment of the controller is in the ECO mode, and a background service or a grant-free service is being performed, the user equipment may access the target base station in the connected mode. The user equipment directly enters the connected mode without the need of entering the idle mode when accessing the target base station, thereby ensuring service continuity of the user equipment, and reducing signaling overheads.

Figure 6:
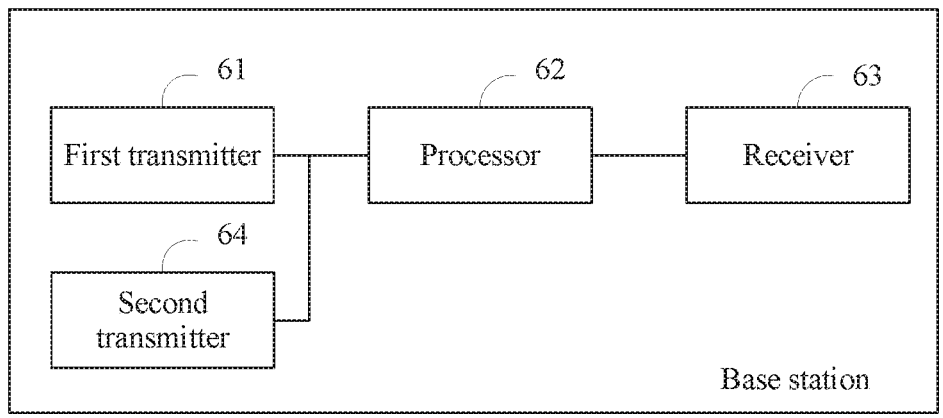
FIG. 6 is a schematic structural diagram of Embodiment 1 of a base station according to an embodiment of the present invention.

FIG. 6 is a schematic structural diagram of Embodiment 1 of a base station according to an embodiment of the present invention. As shown in FIG. 6, the base station provided in this embodiment of the present invention includes a first transmitter 61, a processor 62, a receiver 63, and a second transmitter 64.

The first transmitter 61 is configured to send a handover request message to a target controller under an instruction of the processor 62.

The handover request message is used to instruct the target controller to configure a parameter for user equipment based on the handover request message, and the parameter includes connection status information that is indicated by the target controller and that is of the user equipment when the user equipment is handed over to a cell managed by the target controller. The base station has been connected to the user equipment.

The receiver 63 is configured to receive, from the target controller, a handover request response message including the parameter.

The second transmitter 64 is configured to send, under an instruction of the processor 62, a connection reconfiguration message including the parameter to the user equipment.

The connection reconfiguration message is used to instruct the user equipment to establish, based on the parameter and in a connection status indicated by the connection status information, a connection to the cell managed by the target controller.

Optionally, the first transmitter 61 may be a communications interface, and the second transmitter 64 may be an antenna unit, a radio frequency unit, or the like.

Optionally, the handover request message includes bearer information of the user equipment. The bearer information is used to instruct the target controller to indicate the connection status information to the user equipment based on the bearer information.

The base station provided in this embodiment of the present invention is specifically configured to perform the steps performed by the base station in the embodiment shown in FIG. 2. A technical principle and an implementation process of the apparatus embodiment are similar to those of the method embodiment, and details are not described herein again.

According to the base station provided in this embodiment of the present invention, the first transmitter is configured to send the handover request message to the target controller under an instruction of the processor. The receiver is configured to receive, from the target controller, the handover request response message including the parameter. The second transmitter is configured to send, under an instruction of the processor, the connection reconfiguration message including the parameter to the user equipment. Therefore, the user equipment is handed over, in a proper connection status, from a cell managed by the base station to a cell managed by the target controller, service continuity of the user equipment in a moving process is implemented, and a throughput of the user equipment is improved.

Further, in the base station provided in this embodiment of the present invention, the parameter further includes a first uplink reference signal and a channel used to send the first uplink reference signal, a second uplink reference signal and a channel used to send the second uplink reference signal, and an access sequence and a channel used to send the access sequence. The connection status information includes first connection status information or second connection status information. The first connection status information is used to instruct the user equipment to send, at preset first frequency through the channel used to send the first uplink reference signal, the first uplink reference signal to a TP managed by the target controller. The second connection status information is used to instruct the user equipment to send, at preset second frequency through the channel used to send the second uplink reference signal, the second uplink reference signal to the TP. The preset first frequency is greater than the preset second frequency. The receiver 63 is further configured to receive a context release message from the target controller. The processor 62 is further configured to release a context of the user equipment based on the context release message. The base station is specifically configured to perform the steps performed by the base station in the embodiment shown in FIG. 3A to FIG. 3D. A technical principle and an implementation process of the apparatus embodiment are similar to those of the method embodiment, and details are not described herein again.

Figure 7:
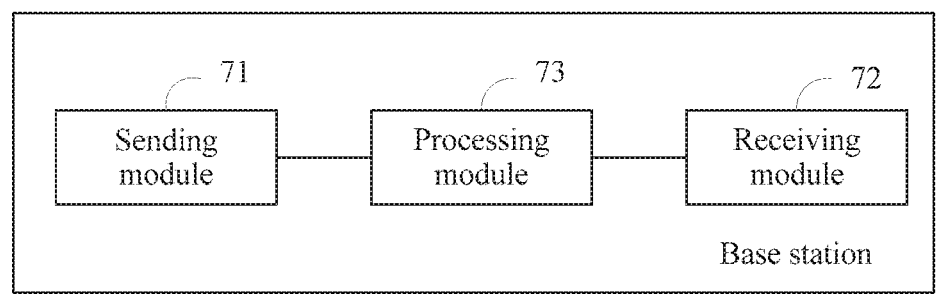
FIG. 7 is a schematic structural diagram of Embodiment 2 of a base station according to an embodiment of the present invention.

FIG. 7 is a schematic structural diagram of Embodiment 2 of a base station according to an embodiment of the present invention. As shown in FIG. 7, the base station provided in this embodiment of the present invention includes a sending module 71, a receiving module 72, and a processing module 73.

The sending module 71 is configured to send a handover request message to a target controller under an instruction of the processing module 73.

The handover request message is used to instruct the target controller to configure a parameter for user equipment based on the handover request message, and the parameter includes connection status information that is indicated by the target controller and that is of the user equipment when the user equipment is handed over to a cell managed by the target controller. The base station has been connected to the user equipment.

The receiving module 72 is configured to receive, from the target controller, a handover request response message including the parameter.

The sending module 71 is further configured to send, under an instruction of the processing module 73, a connection reconfiguration message including the parameter to the user equipment.

The connection reconfiguration message is used to instruct the user equipment to establish, based on the parameter and in a connection status indicated by the connection status information, a connection to the cell managed by the target controller.

Optionally, the handover request message further includes bearer information of the user equipment. The bearer information is used to instruct the target controller to indicate the connection status information to the user equipment based on the bearer information.

The base station provided in this embodiment of the present invention is specifically configured to perform the steps performed by the base station in the embodiment shown in FIG. 2. A technical principle and an implementation process of the apparatus embodiment are similar to those of the method embodiment, and details are not described herein again.

Further, in the base station provided in this embodiment of the present invention, the parameter further includes a first uplink reference signal and a channel used to send the first uplink reference signal, a second uplink reference signal and a channel used to send the second uplink reference signal, and an access sequence and a channel used to send the access sequence. The connection status information includes first connection status information or second connection status information. The first connection status information is used to instruct the user equipment to send, at preset first frequency through the channel used to send the first uplink reference signal, the first uplink reference signal to a TP managed by the target controller. The second connection status information is used to instruct the user equipment to send, at preset second frequency through the channel used to send the second uplink reference signal, the second uplink reference signal to the TP. The preset first frequency is greater than the preset second frequency. The receiving module 72 is further configured to receive a context release message from the target controller. The processing module 73 is further configured to release a context of the user equipment based on the context release message. The base station is specifically configured to perform the steps performed by the base station in the embodiment shown in FIG. 3A to FIG. 3D. A technical principle and an implementation process of the apparatus embodiment are similar to those of the method embodiment, and details are not described herein again.

Figure 8:
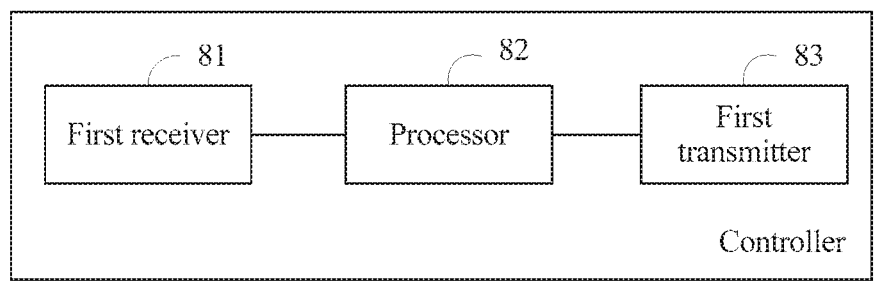
FIG. 8 is a schematic structural diagram of Embodiment 1 of a controller according to an embodiment of the present invention.

FIG. 8 is a schematic structural diagram of Embodiment 1 of a controller according to an embodiment of the present invention. As shown in FIG. 8, the controller provided in this embodiment of the present invention includes a first receiver 81, a processor 82, and a first transmitter 83.

The first receiver 81 is configured to receive a handover request message from a base station.

The controller is a target controller to which user equipment is to be handed over. The base station has been connected to the user equipment.

The processor 82 is configured to configure a parameter for the user equipment based on the handover request message.

The parameter includes connection status information that is indicated by the controller and that is of the user equipment when the user equipment is handed over to a cell managed by the controller.

The first transmitter 83 is configured to send, under an instruction of the processor 82, a handover request response message including the parameter to the base station.

The handover request response message is used to instruct the base station to send a connection reconfiguration message including the parameter to the user equipment.

Optionally, the handover request message further includes bearer information of the user equipment. The bearer information is used to instruct the target controller to indicate the connection status information to the user equipment based on the bearer information.

Optionally, the first receiver 81 may be a communications interface. The first transmitter 83 may be a communications interface.

The controller provided in this embodiment of the present invention is specifically configured to perform the steps performed by the controller in the embodiment shown in FIG. 2. A technical principle and an implementation process of the apparatus embodiment are similar to those of the method embodiment, and details are not described herein again.

According to the controller provided in this embodiment of the present invention, the first receiver is configured to receive the handover request message from the base station. The processor is configured to configure the parameter for the user equipment based on the handover request message. The first transmitter is configured to send, under an instruction of the processor, the handover request response message including the parameter to the base station. Therefore, the user equipment is handed over, in a proper connection status, from a cell managed by the base station to a cell managed by the target controller, service continuity of the user equipment in a moving process is implemented, and a throughput of the user equipment is improved.

Figure 9:
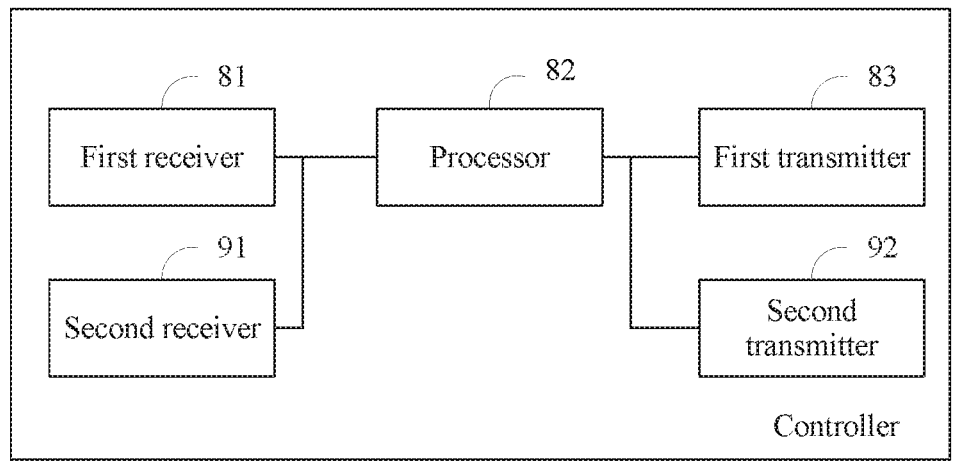
FIG. 9 is a schematic structural diagram of Embodiment 2 of a controller according to an embodiment of the present invention.

FIG. 9 is a schematic structural diagram of Embodiment 2 of a controller according to an embodiment of the present invention. As shown in FIG. 9, based on the embodiment shown in FIG. 8, the controller provided in this embodiment of the present invention further includes a second receiver 91 and a second transmitter 92.

The second receiver 91 is configured to receive a measurement report from a TP.

The processor 82 is further configured to determine a target TP in the TP based on the measurement report.

The second transmitter 92 is configured to send a configuration message to the target TP under an instruction of the processor 82.

The configuration information is used to instruct the target TP to perform data transmission with the user equipment.

The second receiver 91 is further configured to receive a connection complete indication message from the target TP.

The connection complete indication message is used to indicate that the user equipment is connected to the target TP.

The first transmitter 83 is further configured to send a context release message to the base station under an instruction of the processor 82.

Optionally, the parameter further includes a first uplink reference signal and a channel used to send the first uplink reference signal, a second uplink reference signal and a channel used to send the second uplink reference signal, and an access sequence and a channel used to send the access sequence. The connection status information includes first connection status information or second connection status information. The first connection status information is used to instruct the user equipment to send, at preset first frequency through the channel used to send the first uplink reference signal, the first uplink reference signal to a TP managed by the target controller. The second connection status information is used to instruct the user equipment to send, at preset second frequency through the channel used to send the second uplink reference signal, the second uplink reference signal to the TP. The preset first frequency is greater than the preset second frequency.

Optionally, the second receiver 91 and the second transmitter 92 may be an antenna unit, a radio frequency unit, or the like.

The controller provided in this embodiment of the present invention is specifically configured to perform the steps performed by the controller in the embodiment shown in FIG. 3A to FIG. 3D. A technical principle and an implementation process of the apparatus embodiment are similar to those of the method embodiment, and details are not described herein again.

According to the controller provided in this embodiment of the present invention, the second receiver is configured to receive the measurement report from the TP. The processor is further configured to determine the target TP in the TP based on the measurement report. The second transmitter is configured to send the configuration message to the target TP under an instruction of the processor, and the second receiver is further configured to receive the connection complete indication message from the target TP. The first transmitter is further configured to send the context release message to the base station under an instruction of the processor. Therefore, after receiving the context release message sent by the target controller, the base station releases a context of the user equipment based on the context release message, so as to save an air interface resource. In addition, the user equipment may determine, based on the connection status information, a type of an uplink reference signal and frequency at which the uplink reference signal is sent to the TP of the target controller. When the user equipment of the base station performs a background service or a grant-free service, and the user equipment is handed over to the cell managed by the target controller, the user equipment directly enters a second connection status, so as to reduce power consumption of the user equipment.

Figure 10:
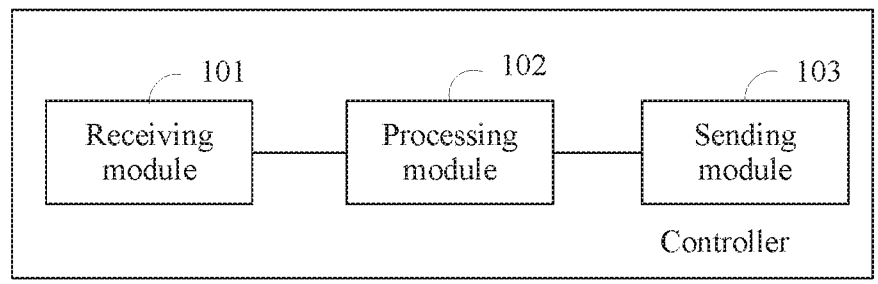
FIG. 10 is a schematic structural diagram of Embodiment 3 of a controller according to an embodiment of the present invention.

FIG. 10 is a schematic structural diagram of Embodiment 3 of a controller according to an embodiment of the present invention. As shown in FIG. 10, the controller provided in this embodiment of the present invention includes a receiving module 101, a processing module 102, and a sending module 103.

The receiving module 101 is configured to receive a handover request message from a base station.

The controller is a target controller to which user equipment is to be handed over. The base station has been connected to the user equipment.

The processing module 102 is configured to configure a parameter for the user equipment based on the handover request message.

The parameter includes connection status information that is indicated by the controller and that is of the user equipment when the user equipment is handed over to a cell managed by the controller.

The sending module 103 is configured to send, under an instruction of the processing module 102, a handover request response message including the parameter to the base station.

The handover request response message is used to instruct the base station to send a connection reconfiguration message including the parameter to the user equipment.

Optionally, the handover request message further includes bearer information of the user equipment. The bearer information is used to instruct the target controller to indicate the connection status information to the user equipment based on the bearer information.

The controller provided in this embodiment of the present invention is specifically configured to perform the steps performed by the controller in the embodiment shown in FIG. 2. A technical principle and an implementation process of the apparatus embodiment are similar to those of the method embodiment, and details are not described herein again.

Further, in the controller shown in FIG. 10, optionally, the parameter further includes a first uplink reference signal and a channel used to send the first uplink reference signal, a second uplink reference signal and a channel used to send the second uplink reference signal, and an access sequence and a channel used to send the access sequence. The connection status information includes first connection status information or second connection status information. The first connection status information is used to instruct the user equipment to send, at preset first frequency through the channel used to send the first uplink reference signal, the first uplink reference signal to a TP managed by the target controller. The second connection status information is used to instruct the user equipment to send, at preset second frequency through the channel used to send the second uplink reference signal, the second uplink reference signal to the TP. The preset first frequency is greater than the preset second frequency. The receiving module 101 is further configured to receive a measurement report from a TP. The processing module 102 is further configured to determine a target TP in the TP based on the measurement report. The sending module 103 is configured to send a configuration message to the target TP under an instruction of the processing module 102. The configuration information is used to instruct the target TP to perform data transmission with the user equipment. The receiving module 101 is further configured to receive a connection complete indication message from the target TP. The connection complete indication message is used to indicate that the user equipment is connected to the target TP. The sending module 103 is further configured to send a context release message to the base station under an instruction of the processing module 102. The controller is specifically configured to perform the steps performed by the controller in the embodiment shown in FIG. 3A to FIG. 3D. A technical principle and an implementation process of the apparatus embodiment are similar to those of the method embodiment, and details are not described herein again.

Figure 11:
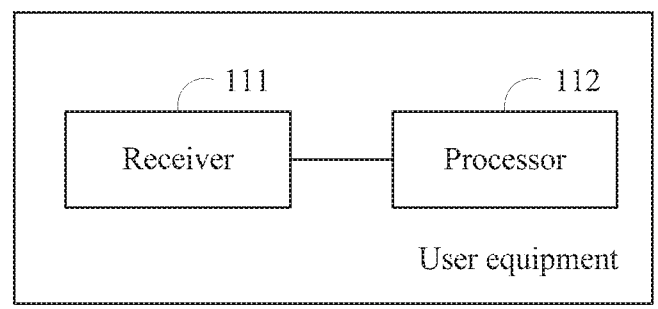
FIG. 11 is a schematic structural diagram of Embodiment 1 of user equipment according to an embodiment of the present invention.

FIG. 11 is a schematic structural diagram of Embodiment 1 of user equipment according to an embodiment of the present invention. As shown in FIG. 11, the user equipment provided in this embodiment of the present invention includes a receiver 111 and a processor 112.

The receiver 111 is configured to receive a connection reconfiguration message including a parameter from a base station.

The parameter is configured by a target controller for the user equipment based on a handover request message, and the parameter includes connection status information that is indicated by the target controller and that is of the user equipment when the user equipment is handed over to a cell managed by the target controller. The base station has been connected to the user equipment.

The processor 112 is configured to establish, based on the parameter and in a connection status indicated by the connection status information, a connection to the cell managed by the target controller.

Optionally, the handover request message includes bearer information of the user equipment, and the bearer information is used to instruct the target controller to indicate the connection status information to the user equipment based on the bearer information.

The user equipment provided in this embodiment of the present invention may be specifically configured to perform the steps performed by the user equipment in the embodiment shown in FIG. 2. A technical principle and an implementation process of the apparatus embodiment are similar to those of the method embodiment, and details are not described herein again.

According to the user equipment provided in this embodiment of the present invention, the receiver is configured to receive, from the base station, the connection reconfiguration message including the parameter. The processor is configured to establish, based on the parameter and in the connection status indicated by the connection status information, the connection to the cell managed by the target controller. Therefore, the user equipment is handed over, in a proper connection status, from a cell managed by the base station to a cell managed by the target controller, service continuity of the user equipment in a moving process is implemented, and a throughput of the user equipment is improved.

Figure 12:
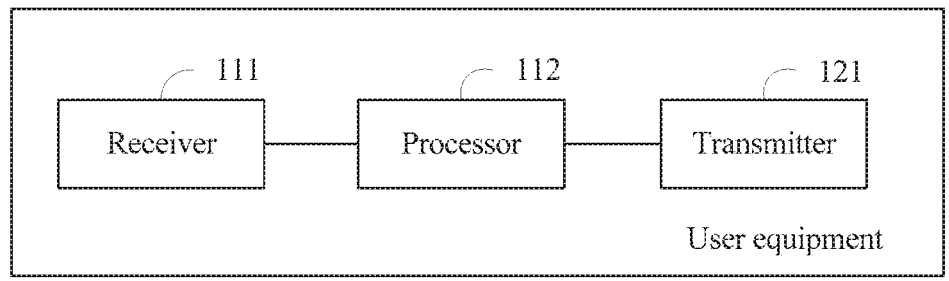
FIG. 12 is a schematic structural diagram of Embodiment 2 of user equipment according to an embodiment of the present invention.

FIG. 12 is a schematic structural diagram of Embodiment 2 of user equipment according to an embodiment of the present invention. As shown in FIG. 12, based on the embodiment shown in FIG. 11, the user equipment provided in this embodiment of the present invention further includes a transmitter 121.

Optionally, the parameter further includes a first uplink reference signal and a channel used to send the first uplink reference signal, a second uplink reference signal and a channel used to send the second uplink reference signal, and an access sequence and a channel used to send the access sequence. The connection status information includes first connection status information or second connection status information. The first connection status information is used to instruct the user equipment to send, at preset first frequency through the channel used to send the first uplink reference signal, the first uplink reference signal to a TP managed by the target controller. The second connection status information is used to instruct the user equipment to send, at preset second frequency through the channel used to send the second uplink reference signal, the second uplink reference signal to the TP. The preset first frequency is greater than the preset second frequency.

When the connection status information is the first connection status information, the transmitter 121 is configured to send, at the preset first frequency through the channel used to send the first uplink reference signal, the first uplink reference signal to the TP under an instruction of the processor 112.

When the connection status information is the second connection status information, the transmitter 121 is configured to send, at the preset second frequency through the channel used to send the second uplink reference signal, the second uplink reference signal to the TP under an instruction of the processor 112.

The receiver 111 is further configured to receive an access response message from a target TP in the TP.

The transmitter 121 is further configured to send a connection reconfiguration complete message to the target TP under an instruction of the processor 112.

The user equipment provided in this embodiment of the present invention may be specifically configured to perform the steps performed by the user equipment in the embodiment shown in FIG. 3A to FIG. 3D. A technical principle and an implementation process of the apparatus embodiment are similar to those of the method embodiment, and details are not described herein again.

According to the user equipment provided in this embodiment of the present invention, when the connection status information is the first connection status information, the transmitter is configured to send, at the preset first frequency through the channel used to send the first uplink reference signal, the first uplink reference signal to the TP under an instruction of the processor; or when the connection status information is the second connection status information, the transmitter is configured to send, at the preset second frequency through the channel used to send the second uplink reference signal, the second uplink reference signal to the TP under an instruction of the processor. The receiver is further configured to receive an access response message from the target TP in the TP. The transmitter is further configured to send a connection reconfiguration complete message to the target TP under an instruction of the processor. Therefore, after receiving a context release message sent by the target controller, the base station releases a context of the user equipment based on the context release message, so as to save an air interface resource. In addition, the user equipment may determine, based on the connection status information, a type of an uplink reference signal and frequency at which the uplink reference signal is sent to the TP of the target controller. When the user equipment of the base station performs a background service or a grant-free service, and the user equipment is handed over to the cell managed by the target controller, the user equipment directly enters a second connection status, so as to reduce power consumption of the user equipment.

Figure 13:
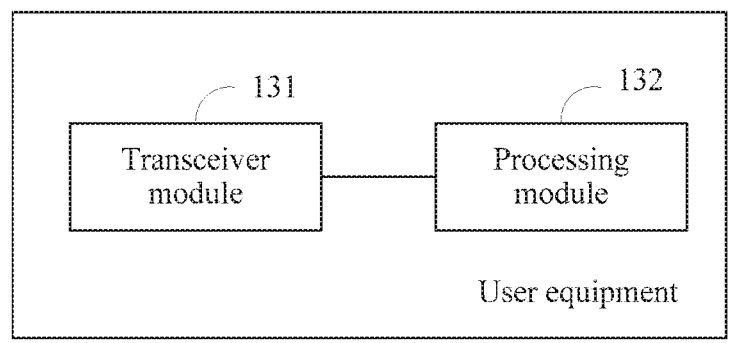
FIG. 13 is a schematic structural diagram of Embodiment 3 of user equipment according to an embodiment of the present invention.

FIG. 13 is a schematic structural diagram of Embodiment 3 of user equipment according to an embodiment of the present invention. As shown in FIG. 13, the user equipment provided in this embodiment of the present invention includes a transceiver module 131 and a processing module 132.

The transceiver 131 is configured to receive a connection reconfiguration message including a parameter from a base station.

The parameter is configured by a target controller for the user equipment based on a handover request message, and the parameter includes connection status information that is indicated by the target controller and that is of the user equipment when the user equipment is handed over to a cell managed by the target controller. The base station has been connected to the user equipment.

The processing module 132 is configured to establish, based on the parameter and in a connection status indicated by the connection status information, a connection to the cell managed by the target controller.

Optionally, the handover request message includes bearer information of the user equipment, and the bearer information is used to instruct the target controller to indicate the connection status information to the user equipment based on the bearer information.

The user equipment provided in this embodiment of the present invention may be specifically configured to perform the steps performed by the user equipment in the embodiment shown in FIG. 2. A technical principle and an implementation process of the apparatus embodiment are similar to those of the method embodiment, and details are not described herein again.

Further, in the user equipment shown in FIG. 13, optionally, the parameter further includes a first uplink reference signal and a channel used to send the first uplink reference signal, a second uplink reference signal and a channel used to send the second uplink reference signal, and an access sequence and a channel used to send the access sequence. The connection status information includes first connection status information or second connection status information. The first connection status information is used to instruct the user equipment to send, at preset first frequency through the channel used to send the first uplink reference signal, the first uplink reference signal to a TP managed by the target controller. The second connection status information is used to instruct the user equipment to send, at preset second frequency through the channel used to send the second uplink reference signal, the second uplink reference signal to the TP. The preset first frequency is greater than the preset second frequency. When the connection status information is the first connection status information, the transceiver module 131 is configured to send, at the preset first frequency through the channel used to send the first uplink reference signal, the first uplink reference signal to the TP under an instruction of the processing module 132. When the connection status information is the second connection status information, the transceiver module 131 is configured to send, at the preset second frequency through the channel used to send the second uplink reference signal, the second uplink reference signal to the TP under an instruction of the processing w0 module 132. The transceiver module 131 is further configured to receive an access response message from a target TP in the TP. The transceiver module 131 is further configured to send a connection reconfiguration complete message to the target TP under an instruction of the processing module 132. The user equipment may be specifically configured to perform the steps performed by the user equipment in the embodiment shown in FIG. 3A to FIG. 3D. A technical principle and an implementation process of the apparatus embodiment are similar to those of the method embodiment, and details are not described herein again.

Figure 14:
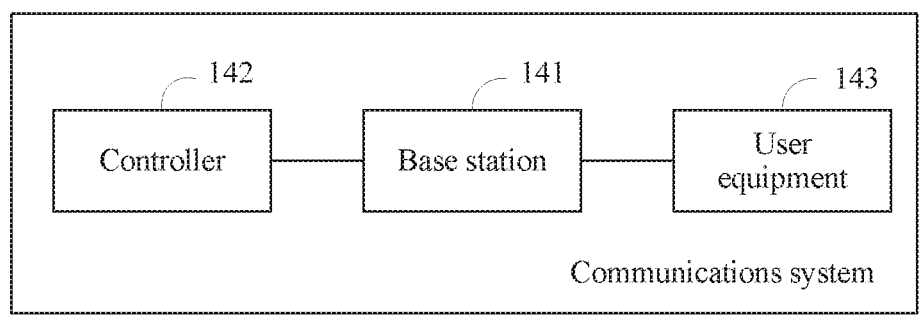
FIG. 14 is a schematic structural diagram of Embodiment 1 of a communications system according to an embodiment of the present invention.

FIG. 14 is a schematic structural diagram of Embodiment 1 of a communications system according to an embodiment of the present invention. As shown in FIG. 14, the communications system provided in this embodiment of the present invention includes a base station 141, a controller 142, and user equipment 143.

According to the communications system provided in this embodiment of the present invention, the base station 141 is configured to send a handover request message to the controller 142, where the handover request message is used to instruct the controller to configure a parameter for the user equipment based on the handover request message, the parameter includes connection status information that is indicated by the controller and that is of the user equipment when the user equipment is handed over to a cell managed by the controller, and the base station has been connected to the user equipment 143. The base station 141 receives, from the controller 142, a handover request response message including the parameter. The base station 141 sends a connection reconfiguration message including the parameter to the user equipment 143. The connection reconfiguration message is used to instruct the user equipment to establish, based on the parameter and in a connection status indicated by the connection status information, a connection to the cell managed by the controller.

The controller 142 receives a handover request message from the base station 141. The controller 142 is a controller to which the user equipment is to be handed over. The base station 141 is connected to the user equipment 143. The controller 142 configures a parameter for the user equipment based on the handover request message, where the parameter includes connection status information that is indicated by the controller and that is of the user equipment when the user equipment is handed over to a cell managed by the controller. The controller 142 sends a handover request response message including the parameter to the base station 141, where the handover request response message is used to instruct the base station to send a connection reconfiguration message including the parameter to the user equipment.

The user equipment 143 receives, from the base station 141, a connection reconfiguration message including a parameter, where the parameter is configured by the controller for the user equipment based on a handover request message, the parameter includes connection status information that is indicated by the controller and that is of the user equipment when the user equipment is handed over to a cell managed by the controller, and the base station has been connected to the user equipment. The user equipment 143 establishes, based on the parameter and in a connection status indicated by the connection status information, a connection to the cell managed by the controller.

Figure 3A:
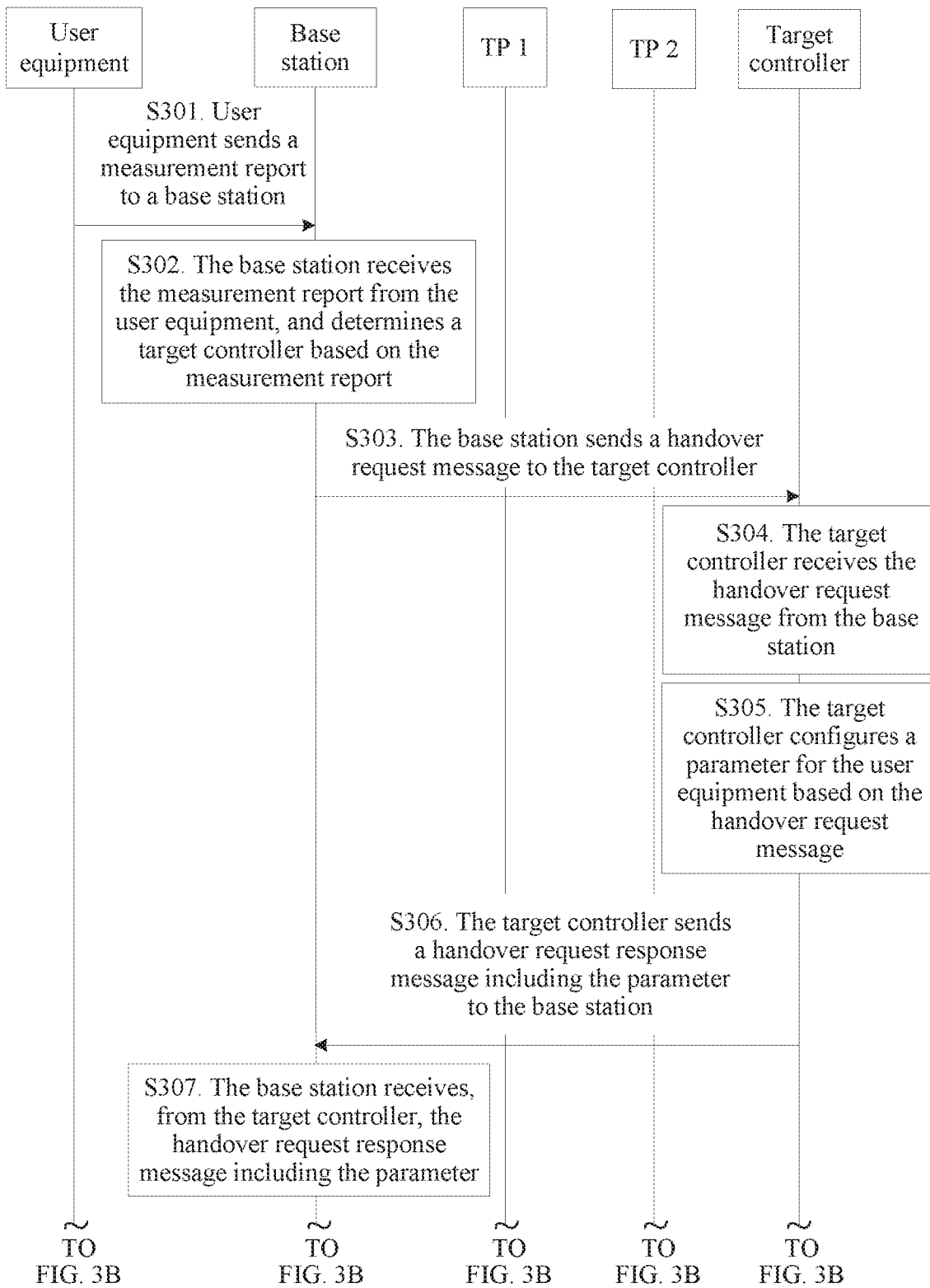
FIG. 3A to FIG. 3D are a signaling interaction diagram of Embodiment 2 of a handover method according to an embodiment of the present invention.
Figure 3B:
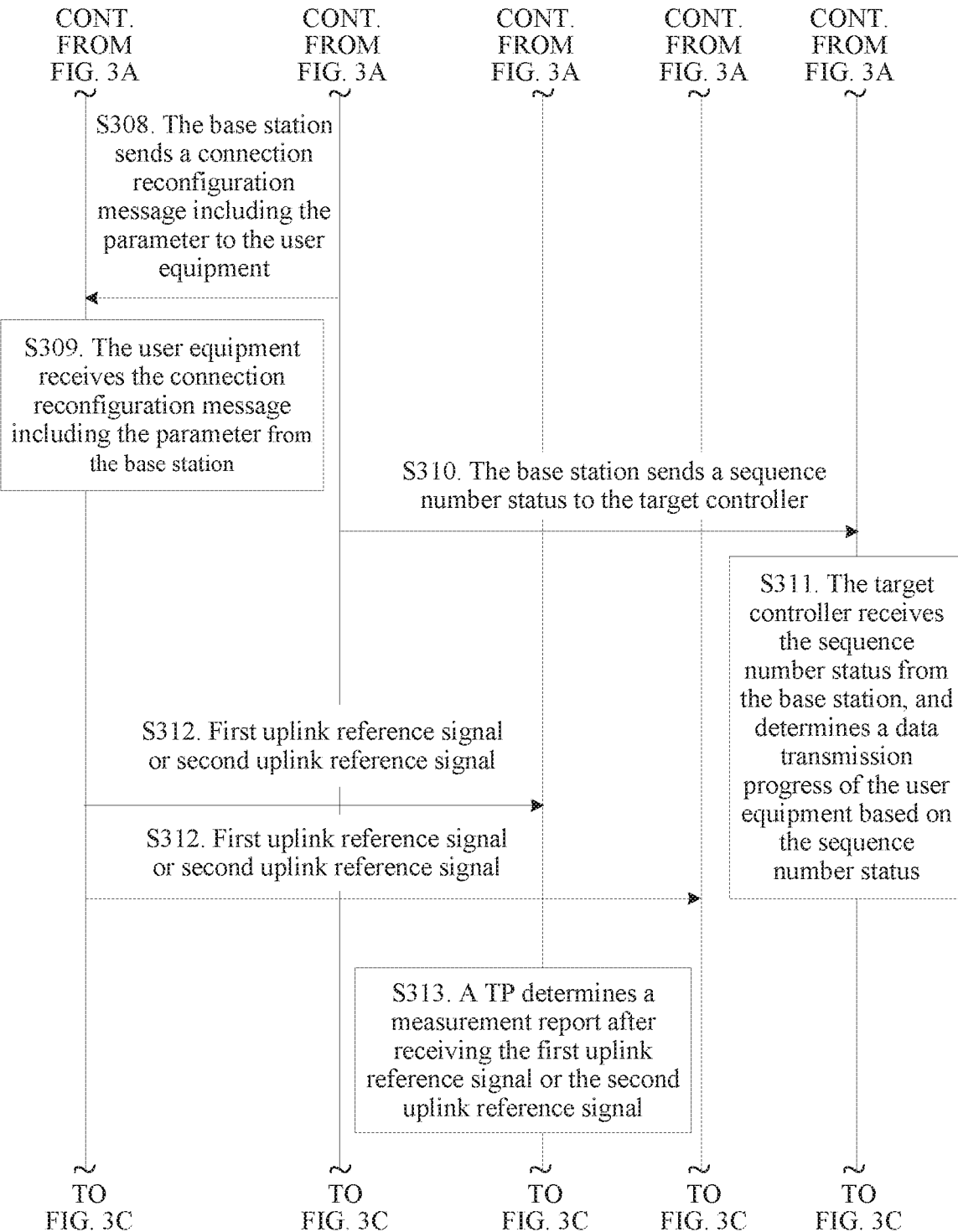
Figure 3C:
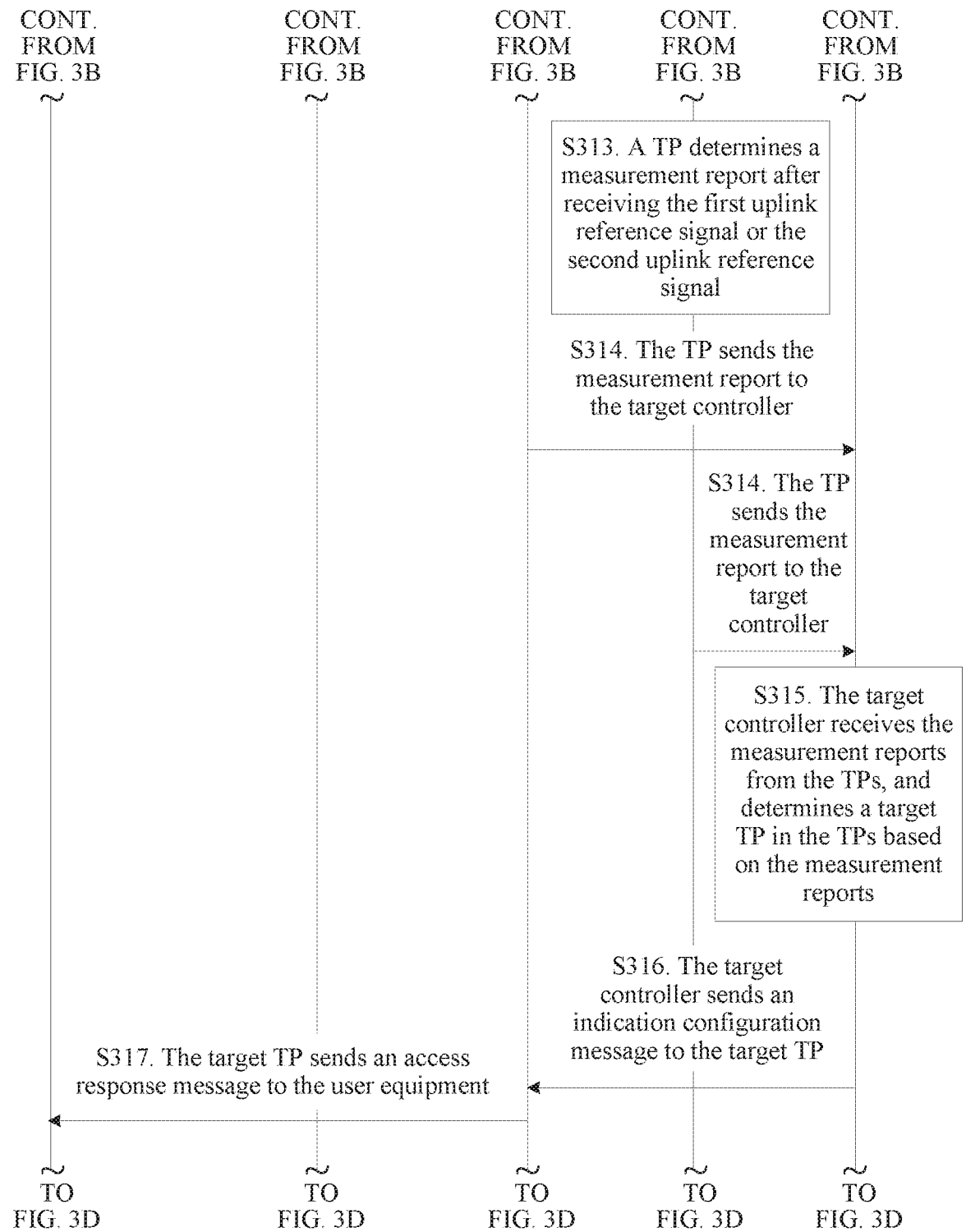
Figure 3D:
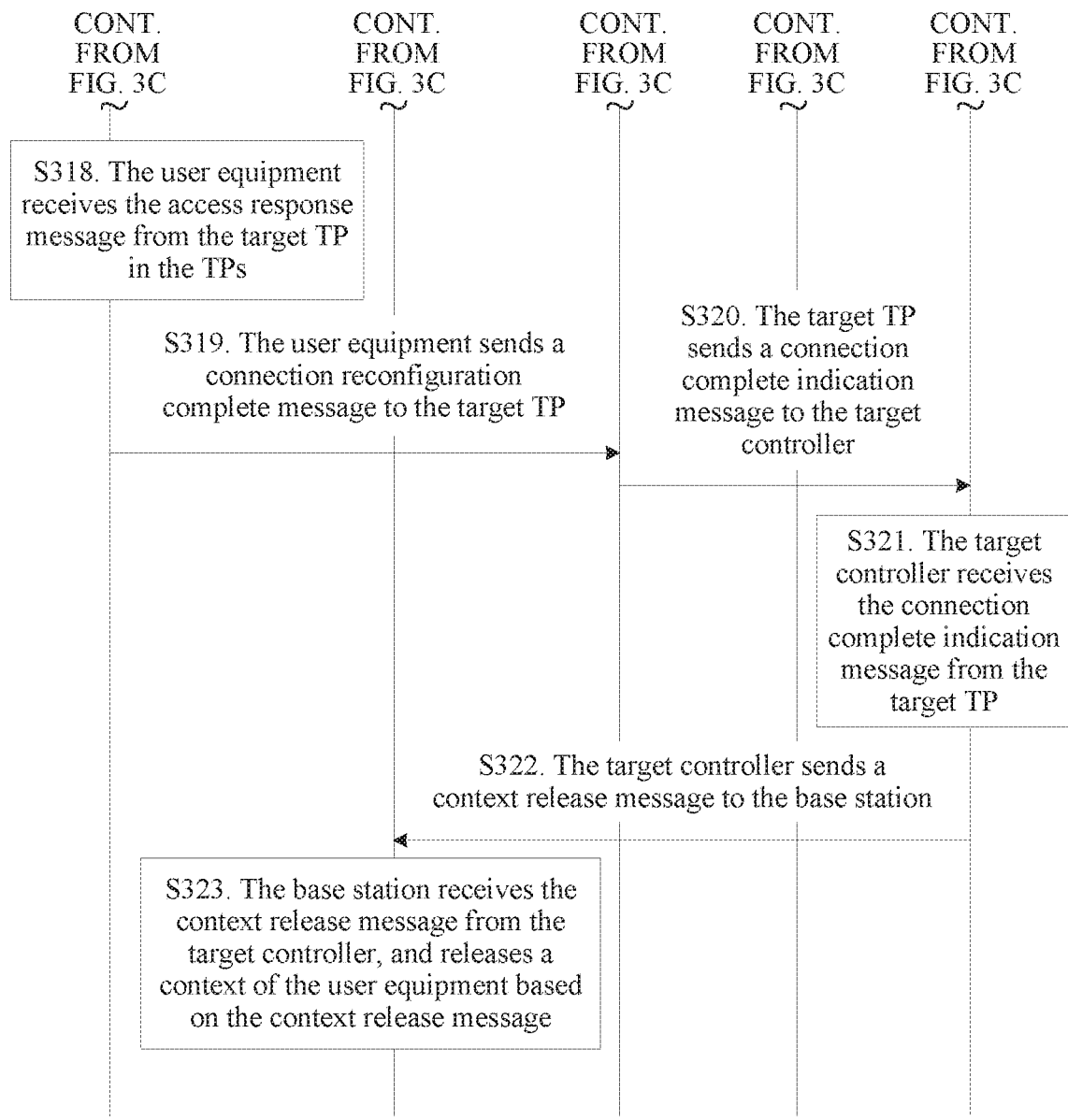

The communications system provided in this embodiment of the present invention may be specifically used to perform the method embodiments shown in FIG. 2 to FIG. 3D. A technical principle, an implementation process, and a technical effect of the communications system are similar to those of the method embodiments, and details are not described herein again.

Figure 15:
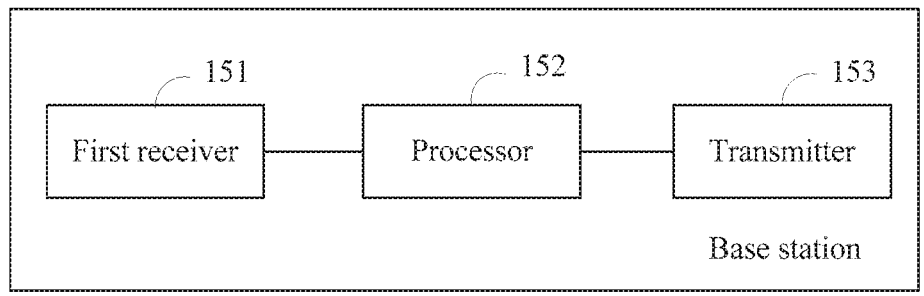
FIG. 15 is a schematic structural diagram of Embodiment 3 of a base station according to an embodiment of the present invention.

FIG. 15 is a schematic structural diagram of Embodiment 3 of a base station according to an embodiment of the present invention. As shown in FIG. 15, the base station provided in this embodiment of the present invention includes a first receiver 151, a processor 152, and a transmitter 153.

The first receiver 151 is configured to receive a handover request message from a controller.

The base station is a target base station to which user equipment is to be handed over. The controller has been connected to the user equipment.

The processor 152 is configured to configure a parameter for the user equipment based on the handover request message.

The parameter includes connection status information that is indicated by the base station and that is of the user equipment when the user equipment is handed over to a cell managed by the base station.

The transmitter 153 is configured to send, under an instruction of the processor 152, a handover request response message including the parameter to the controller.

The handover request response message is used to instruct the controller to send a connection reconfiguration message including the parameter to the user equipment.

Optionally, the first receiver 151 may be a communications interface. The transmitter 153 may also be a communications interface.

Optionally, the handover request message includes information about a service that is being performed by the user equipment. The service information is used to instruct the base station to indicate the connection status information to the user equipment based on the service information.

The base station provided in this embodiment of the present invention may be specifically configured to perform the steps performed by the base station in the embodiment shown in FIG. 4. A technical principle, an implementation process, and a technical effect of the apparatus embodiment are similar to those of the method embodiment, and details are not described herein again.

Figure 16:
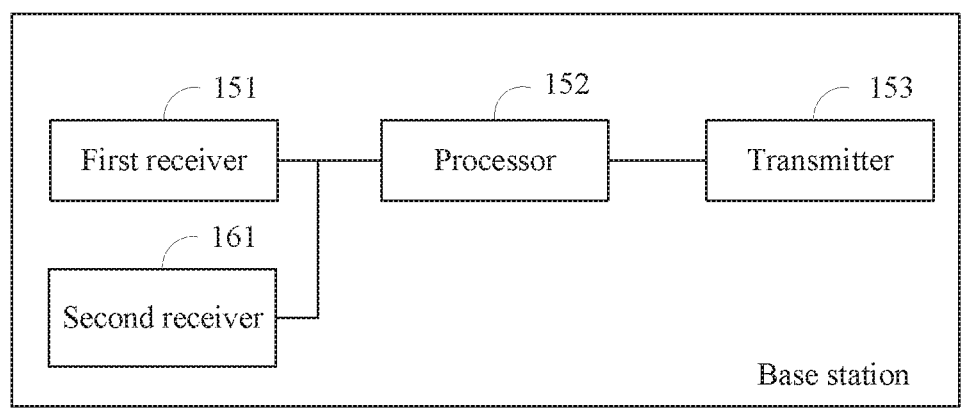
FIG. 16 is a schematic structural diagram of Embodiment 4 of a base station according to an embodiment of the present invention.

FIG. 16 is a schematic structural diagram of Embodiment 4 of a base station according to an embodiment of the present invention. As shown in FIG. 16, based on the embodiment shown in FIG. 15, the base station provided in this embodiment of the present invention further includes a second receiver 161.

The second receiver 161 is configured to a connection reconfiguration complete message from the user equipment.

The transmitter 153 is configured to send a context release message to the controller under an instruction of the processor 152.

Optionally, the second receiver 161 may be an antenna unit, a radio frequency unit, or the like.

Optionally, the service information includes a service type and a quantity of services. The processor 152 is specifically configured to: when the quantity of services is zero, indicate that the terminal device is in an idle mode; when the quantity of services is not zero, and the service type belongs to a preset service type, indicate that the terminal device is in an idle mode; or when the quantity of services is not zero, and the service type does not belong to a preset service type, indicate that the terminal device is in a connected mode.

The base station provided in this embodiment of the present invention may be specifically configured to perform the steps performed by the base station in the embodiment shown in FIG. 5A to FIG. 5C. A technical principle, an implementation process, and a technical effect of the apparatus embodiment are similar to those of the method embodiment, and details are not described herein again.

Figure 17:
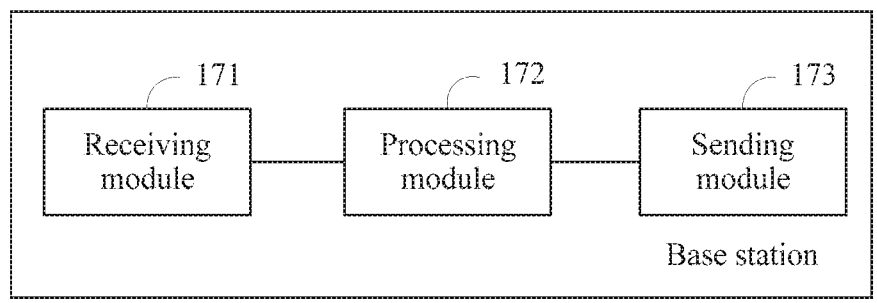
FIG. 17 is a schematic structural diagram of Embodiment 5 of a base station according to an embodiment of the present invention.

FIG. 17 is a schematic structural diagram of Embodiment 5 of a base station according to an embodiment of the present invention. As shown in FIG. 15, the base station provided in this embodiment of the present invention includes a receiving module 171, a processing module 172, and a sending module 173.

The receiving module 171 is configured to receive a handover request message from a controller.

The base station is a target base station to which user equipment is to be handed over. The controller has been connected to the user equipment.

The processing module 172 is configured to configure a parameter for the user equipment based on the handover request message.

The parameter includes connection status information that is indicated by the base station and that is of the user equipment when the user equipment is handed over to a cell managed by the base station.

The sending module 173 is configured to send, under an instruction of the processing module 172, a handover request response message including the parameter to the controller.

The handover request response message is used to instruct the controller to send a connection reconfiguration message including the parameter to the user equipment.

Optionally, the handover request message includes information about a service that is being performed by the user equipment. The service information is used to instruct the base station to indicate the connection status information to the user equipment based on the service information.

The base station provided in this embodiment of the present invention may be specifically configured to perform the steps performed by the base station in the embodiment shown in FIG. 4. A technical principle, an implementation process, and a technical effect of the apparatus embodiment are similar to those of the method embodiment, and details are not described herein again.

Further, in the base station provided in the foregoing embodiment of the present invention, the receiving module 171 is further configured to receive a connection reconfiguration complete message from the user equipment. The sending module 173 is configured to send a context release message to the controller under an instruction of the processing module 172. Optionally, the service information includes a service type and a quantity of services. The processing module 172 is specifically configured to: when the quantity of services is zero, indicate that the terminal device is in an idle mode; when the quantity of services is not zero, and the service type belongs to a preset service type, indicate that the terminal device is in an idle mode; or when the quantity of services is not zero, and the service type does not belong to a preset service type, indicate that the terminal device is in a connected mode. The base station may be specifically configured to perform the steps performed by the base station in the embodiment shown in FIG. 5A to FIG. 5C. A technical principle, an implementation process, and a technical effect of the apparatus embodiment are similar to those of the method embodiment, and details are not described herein again.

Figure 18:
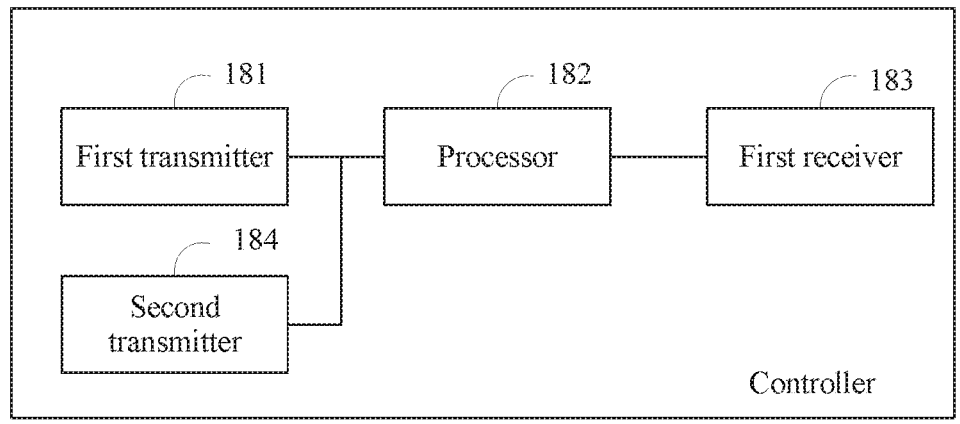
FIG. 18 is a schematic structural diagram of Embodiment 4 of a controller according to an embodiment of the present invention.

FIG. 18 is a schematic structural diagram of Embodiment 4 of a controller according to an embodiment of the present invention. As shown in FIG. 18, the controller provided in this embodiment of the present invention includes a first transmitter 181, a processor 182, a first receiver 183, and a second transmitter 184.

The first transmitter 181 is configured to send a handover request message to a target base station under an instruction of the processor 182.

The handover request message is used to instruct the target base station to configure a parameter for the user equipment based on the handover request message. The parameter includes connection status information that is indicated by the target base station and that is of the user equipment when the user equipment is handed over to a cell managed by the target base station. The controller has been connected to the user equipment.

The first receiver 183 is configured to receive a handover request response message including the parameter from the target base station.

The second transmitter 184 is configured to send, under an instruction of the processor 182, a connection reconfiguration message including the parameter to the user equipment.

The connection reconfiguration message is used to instruct the user equipment to establish, based on the parameter and in a connection status indicated by the connection status information, a connection to the cell managed by the target base station.

Optionally, the handover request message includes information about a service that is being performed by the user equipment. The service information is used to instruct the base station to indicate the connection status information to the user equipment based on the service information.

The controller provided in this embodiment of the present invention may be specifically configured to perform the steps performed by the controller in the embodiment shown in FIG. 4. A technical principle, an implementation process, and a technical effect of the apparatus embodiment are similar to those of the method embodiment, and details are not described herein again.

Figure 19:
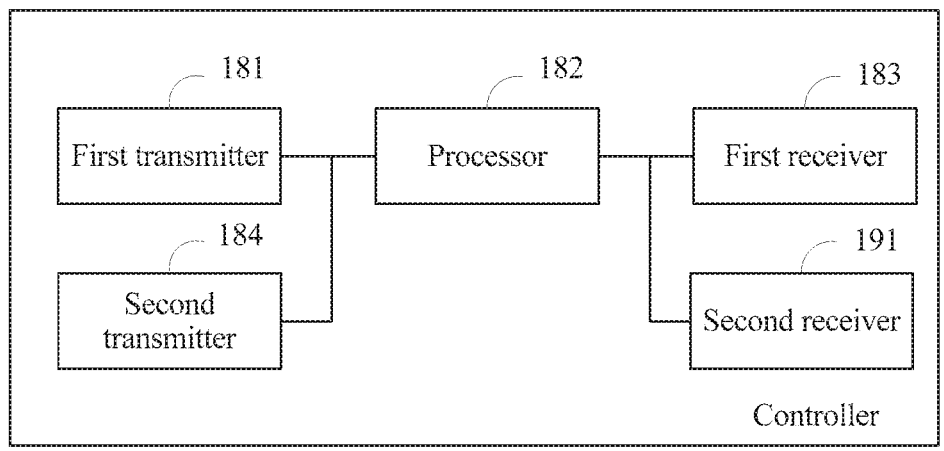
FIG. 19 is a schematic structural diagram of Embodiment 5 of a controller according to an embodiment of the present invention.

FIG. 19 is a schematic structural diagram of Embodiment 5 of a controller according to an embodiment of the present invention. As shown in FIG. 19, based on the controller shown in FIG. 18, the controller provided in this embodiment of the present invention further includes a second receiver 191.

The second receiver 191 is configured to receive a first measurement report from the user equipment, and the processor 182 is further configured to determine the target base station based on the first measurement report. Alternatively, the second receiver 191 is configured to receive a second measurement report from a transmission point TP managed by the controller, and the processor 182 is further configured to determine the target base station based on the second measurement report.

The first receiver 183 is further configured to receive a context release message from the target base station.

The processor 182 is further configured to release a context of the user equipment based on the context release message.

The controller provided in this embodiment of the present invention may be specifically configured to perform the steps performed by the controller in the embodiment shown in FIG. 5A to FIG. 5C. A technical principle, an implementation process, and a technical effect of the apparatus embodiment are similar to those of the method embodiment, and details are not described herein again.

Figure 20:
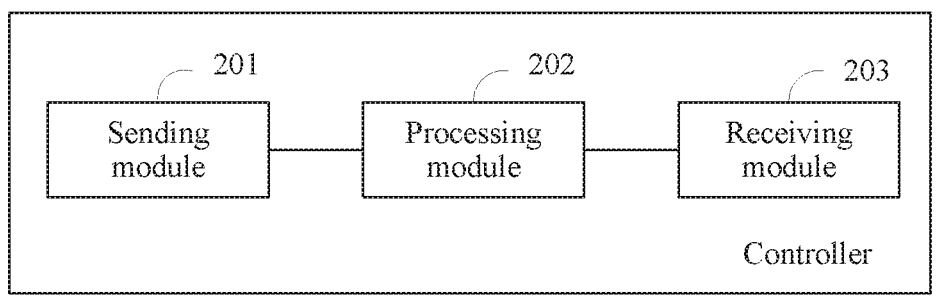
FIG. 20 is a schematic structural diagram of Embodiment 6 of a controller according to an embodiment of the present invention.

FIG. 20 is a schematic structural diagram of Embodiment 6 of a controller according to an embodiment of the present invention. As shown in FIG. 20, the controller provided in this embodiment of the present invention includes a sending module 201, a processing module 202, and a receiving module 203.

The sending module 201 is configured to send a handover request message to a target base station under an instruction of the processing module 202.

The handover request message is used to instruct the target base station to configure a parameter for user equipment based on the handover request message. The parameter includes connection status information that is indicated by the target base station and that is of the user equipment when the user equipment is handed over to a cell managed by the target base station. The controller has been connected to the user equipment.

The receiving module 203 is configured to receive a handover request response message including the parameter from the target base station.

The sending module 201 is further configured to send, under an instruction of the processing module 202, a connection reconfiguration message including the parameter to the user equipment.

The connection reconfiguration message is used to instruct the user equipment to establish, based on the parameter and in a connection status indicated by the connection status information, a connection to the cell managed by the target base station.

Optionally, the handover request message includes information about a service that is being performed by the user equipment. The service information is used to instruct the base station to indicate the connection status information to the user equipment based on the service information.

The controller provided in this embodiment of the present invention may be specifically configured to perform the steps performed by the controller in the embodiment shown in FIG. 4. A technical principle, an implementation process, and a technical effect of the apparatus embodiment are similar to those of the method embodiment, and details are not described herein again.

Further, based on the controller shown in FIG. 20, the receiving module 203 is configured to receive a first measurement report from the user equipment, and the processing module 202 is further configured to determine the target base station based on the first measurement report. Alternatively, the receiving module 203 is configured to receive a second measurement report from a transmission point TP managed by the controller, and the processing module 202 is further configured to determine the target base station based on the second measurement report. The receiving module 203 is further configured to receive a context release message from the target base station. The processing module 202 is further configured to release a context of the user equipment based on the context release message. The controller may be specifically configured to perform the steps performed by the controller in the embodiment shown in FIG. 5A to FIG. 5C. A technical principle, an implementation process, and a technical effect of apparatus embodiment are similar to those of the method embodiment, and details are not described herein again.

Figure 21:
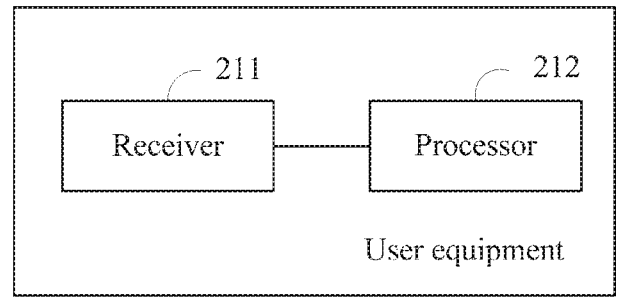
FIG. 21 is a schematic structural diagram of Embodiment 4 of user equipment according to an embodiment of the present invention.

FIG. 21 is a schematic structural diagram of Embodiment 4 of user equipment according to an embodiment of the present invention. As shown in FIG. 21, the user equipment provided in this embodiment of the present invention includes a receiver 211 and a processor 212.

The receiver 211 is configured to receive a connection reconfiguration message including a parameter from a controller.

The parameter is configured by a target base station for the user equipment based on a handover request message, and the parameter includes connection status information that is indicated by the target base station and that is of the user equipment when the user equipment is handed over to a cell managed by the target base station. The user equipment is connected to the controller.

The processor 212 is configured to establish, based on the parameter and in a connection status indicated by the connection status information, a connection to the cell managed by the target base station.

Optionally, the handover request message includes information about a service that is being performed by the user equipment. The service information is used to instruct the base station to indicate the connection status information to the user equipment based on the service information.

The user equipment provided in this embodiment of the present invention may be specifically configured to perform the steps performed by the user equipment in the embodiment shown in FIG. 4. A technical principle, an implementation process, and a technical effect of the apparatus embodiment are similar to those of the method embodiment, and details are not described herein again.

Figure 22:
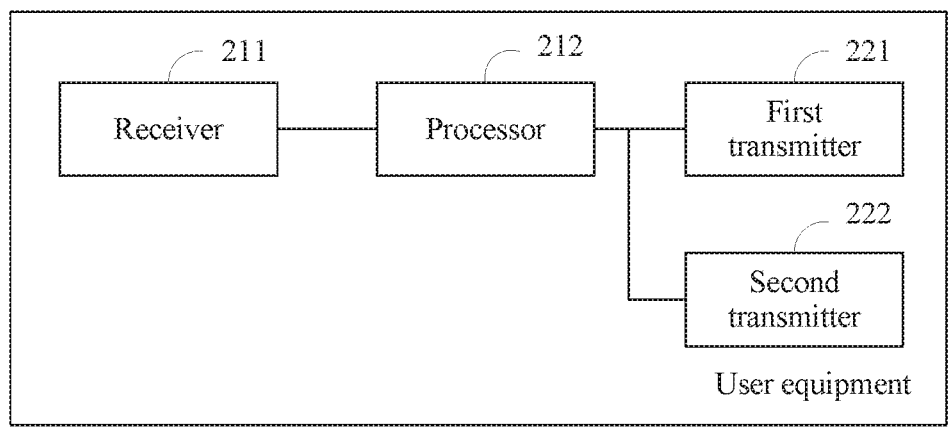
FIG. 22 is a schematic structural diagram of Embodiment 5 of user equipment according to an embodiment of the present invention.

FIG. 22 is a schematic structural diagram of Embodiment 5 of user equipment according to an embodiment of the present invention. As shown in FIG. 22, based on the embodiment shown in FIG. 21, the user equipment provided in this embodiment of the present invention further includes a first transmitter 221 and a second transmitter 222.

The first transmitter 221 is configured to send a first measurement report to the controller under an instruction of the processor 212. Alternatively, the second transmitter 222 is configured to send, under an instruction of the processor 212, an uplink reference signal to a transmission point TP managed by the controller.

The second transmitter 222 is further configured to send a connection reconfiguration complete message to the target base station.

The user equipment provided in this embodiment of the present invention may be specifically configured to perform the steps performed by the user equipment in the embodiment shown in FIG. 5A to FIG. 5C. A technical principle, an implementation process, and a technical effect of the apparatus embodiment are similar to those of the method embodiment, and details are not described herein again.

Figure 23:
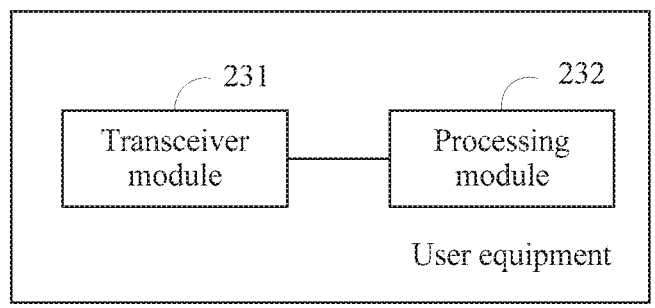
FIG. 23 is a schematic structural diagram of Embodiment 6 of user equipment according to an embodiment of the present invention.

FIG. 23 is a schematic structural diagram of Embodiment 6 of user equipment according to an embodiment of the present invention. As shown in FIG. 23, the user equipment provided in this embodiment of the present invention includes a transceiver module 231 and a processing module 232.

The transceiver 231 is configured to receive a connection reconfiguration message including a parameter from a controller.

The parameter is configured by a target base station for the user equipment based on a handover request message, and the parameter includes connection status information that is indicated by the target base station and that is of the user equipment when the user equipment is handed over to a cell managed by the target base station. The user equipment is connected to the controller.

The processing module 232 is configured to establish, based on the parameter and in a connection status indicated by the connection status information, a connection to the cell managed by the target base station.

Optionally, the handover request message includes information about a service that is being performed by the user equipment. The service information is used to instruct the base station to indicate the connection status information to the user equipment based on the service information.

The user equipment provided in this embodiment of the present invention may be specifically configured to perform the steps performed by the user equipment in the embodiment shown in FIG. 4. A technical principle, an implementation process, and a technical effect of the apparatus embodiment are similar to those of the method embodiment, and details are not described herein again.

Further, in the user equipment shown in FIG. 23, the transceiver module 231 is further configured to send a first measurement report to the controller under an instruction of the processing module 232. Alternatively, the transceiver module 231 is configured to send, under an instruction of the processing module 232, an uplink reference signal to a transmission point TP managed by the controller. The transceiver module 231 is further configured to send a connection reconfiguration complete message to the target base station. The user equipment may be specifically configured to perform the steps performed by the user equipment in the embodiment shown in FIG. 5A to FIG. 5C. A technical principle, an implementation process, and a technical effect of the apparatus embodiment are similar to those of the method embodiment, and details are not described herein again.

Figure 24:
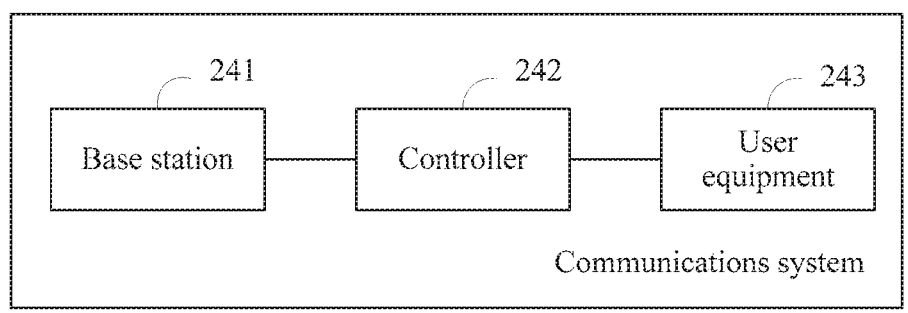
FIG. 24 is a schematic structural diagram of Embodiment 2 of a communications system according to an embodiment of the present invention.

FIG. 24 is a schematic structural diagram of Embodiment 2 of a communications system according to an embodiment of the present invention. As shown in FIG. 24, the communications system provided in this embodiment of the present invention includes a base station 241, a controller 242, and user equipment 243.

The base station 241 is the base station shown in the embodiment of any one of FIG. 15 to FIG. 17. The controller 242 is the controller shown in the embodiment of any one of FIG. 18 to FIG. 20. The user equipment is the user equipment shown in the embodiment of any one of FIG. 21 to FIG. 23.

The communications system provided in this embodiment of the present invention may be specifically used to perform the method embodiments shown in FIG. 4 to FIG. 5C. A technical principle, an implementation process, and a technical effect of the communications system are similar to those of the method embodiments, and details are not described herein again.

In the several embodiments provided in this application, it should be understood that the disclosed apparatus and method may be implemented in other manners. For example, the described device embodiment is merely an example. For example, the unit or module division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented through some interfaces. The indirect couplings or communication connections between the devices or modules may be implemented in electronic, mechanical, or other forms.

The modules described as separate parts may or may not be physically separate, and parts displayed as modules may or may not be physical modules, may be located in one position, or may be distributed on a plurality of network units. Some or all the modules may be selected according to actual needs to achieve the objectives of the solutions of the embodiments.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention.

Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A handover method, comprising:
sending, by a base station, a handover request message to a target controller, wherein the handover request message is used to instruct the target controller to configure a parameter for a user equipment based on the handover request message, wherein the parameter comprises connection status information that is indicated by the target controller and that is of the user equipment when the user equipment is handed over to a cell managed by the target controller, wherein the base station has been connected to the user equipment, wherein the parameter further comprises a first uplink reference signal and a channel used to send the first uplink reference signal, a second uplink reference signal and a channel used to send the second uplink reference signal, and an access sequence and a channel used to send the access sequence, wherein the connection status information comprises first connection status information or second connection status information, wherein the first connection status information is used to instruct the user equipment to send, at preset first frequency through the channel used to send the first uplink reference signal and o a Transmission Point (TP) managed by the target controller, the first uplink reference signal, wherein the second connection status information is used to instruct the user equipment to send, at preset second frequency through the channel used to send the second uplink reference signal and to the TP, the second uplink reference signal, and wherein the preset first frequency is greater than the preset second frequency;
receiving, by the base station and from the target controller, a handover request response message comprising the parameter; and
sending, by the base station, a connection reconfiguration message comprising the parameter to the user equipment, wherein the connection reconfiguration message is used to instruct the user equipment to establish, based on the parameter and in a connection status indicated by the connection status information, a connection to the cell managed by the target controller.

2. The handover method according to claim 1, wherein the handover request message comprises bearer information of the user equipment, and wherein the bearer information is used to instruct the target controller to indicate the connection status information to the user equipment based on the bearer information.

3. The handover method according to claim 1, wherein after the sending, by the base station, a connection reconfiguration message comprising the parameter to the user equipment, the method further comprises:
receiving, by the base station, a context release message from the target controller; and
releasing a context of the user equipment based on the context release message.

4. A base station, comprising:
a first transmitter, the first transmitter configured to send a handover request message to a target controller under an instruction of at least one processor, wherein the handover request message is used to instruct the target controller to configure a parameter for a user equipment based on the handover request message, wherein the parameter comprises connection status information that is indicated by the target controller and that is of the user equipment when the user equipment is handed over to a cell managed by the target controller, wherein the base station has been connected to the user equipment, wherein the parameter further comprises a first uplink reference signal and a channel used to send the first uplink reference signal, a second uplink reference signal and a channel used to send the second uplink reference signal, and an access sequence and a channel used to send the access sequence, wherein the connection status information comprises first connection status information or second connection status information, wherein the first connection status information is used to instruct the user equipment to send, at preset first frequency through the channel used to send the first uplink reference signal and to a Transmission Point (TP) managed by the target controller, the first uplink reference signal, wherein the second connection status information is used to instruct the user equipment to send, at preset second frequency through the channel used to send the second uplink reference signal and to the TP, the second uplink reference signal, and wherein the preset first frequency is greater than the preset second frequency;
a receiver, the receiver configured to receive, from the target controller, a handover request response message comprising the parameter; and
a second transmitter, the second transmitter configured to send, under an instruction of the at least one processor, a connection reconfiguration message comprising the parameter to the user equipment, wherein the connection reconfiguration message is used to instruct the user equipment to establish, based on the parameter and in a connection status indicated by the connection status information, a connection to the cell managed by the target controller.

5. The base station according to claim 4, wherein the handover request message comprises bearer information of the user equipment, and wherein the bearer information is used to instruct the target controller to indicate the connection status information to the user equipment based on the bearer information.

6. The base station according to claim 4, wherein:
the receiver is further configured to receive a context release message from the target controller; and
the at least one processor is further configured to release a context of the user equipment based on the context release message.

7. A controller, comprising:
a first receiver, the first receiver configured to receive a handover request message from a base station, wherein the controller is a target controller to which a user equipment is to be handed over, and wherein the base station has been connected to the user equipment;
at least one processor, the at least one processor configured to configure a parameter for the user equipment based on the handover request message, wherein the parameter comprises connection status information that is indicated by the controller and that is of the user equipment when the user equipment is handed over to a cell managed by the controller, wherein the connection status information comprises first connection status information or second connection status information, wherein the first connection status information is used to instruct the user equipment to send, at preset first frequency through a channel used to send a first uplink reference signal, the first uplink reference signal to a Transmission Point (TP) managed by the target controller, wherein the second connection status information is used to instruct the user equipment to send, at preset second frequency through a channel used to send a second uplink reference signal, the second uplink reference signal to the TP, and wherein the preset first frequency is greater than the preset second frequency; and a first transmitter, the first transmitter configured to send, under an instruction of the at least one processor, a handover request response message comprising the parameter to the base station, wherein the handover request response message is used to instruct the base station to send a connection reconfiguration message comprising the parameter to the user equipment.

8. The controller according to claim 7, wherein the handover request message comprises bearer information of the user equipment, and wherein the bearer information is used to instruct the controller to indicate the connection status information to the user equipment based on the bearer information.

9. The controller according to claim 7, wherein the parameter further comprises the first uplink reference signal and the channel used to send the first uplink reference signal, the second uplink reference signal and the channel used to send the second uplink reference signal, and an access sequence and a channel used to send the access sequence.

10. The controller according to claim 7, wherein the controller further comprises:

a second receiver, the second receiver configured to receive a measurement report from the TP, wherein the at least one processor is further configured to determine a target TP based on the measurement report; and a second transmitter, the second transmitter configured to send a configuration message to the target TP under an instruction of the at least one processor, wherein the configuration message is used to instruct the target TP to perform data transmission with the user equipment.

11. The controller according to claim 10, wherein:

the second receiver is further configured to receive a connection complete indication message from the target TP, wherein the connection complete indication message is used to indicate that the user equipment is connected to the target TP; and the first transmitter is further configured to send a context release message to the base station under an instruction of the at least one processor.

* * * * *

UNITED STATES PATENT AND TRADEMARK OFFICE
CERTIFICATE OF CORRECTION

PATENT NO. : 10,932,162 B2
APPLICATION NO. : 16/295066
DATED : February 23, 2021
INVENTOR(S) : Wenjie Peng and Hongzhuo Zhang Page 1 of 1

It is certified that error appears in the above-identified patent and that said Letters Patent is hereby corrected as shown below:

In the Claims

In Column 43 Line 32 In Claim 1, delete "and o a" and insert --and to a--, therefor.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*